United States Patent
Fleck et al.

(10) Patent No.: US 9,785,275 B2
(45) Date of Patent: Oct. 10, 2017

(54) CONTACT DISCRIMINATION USING A TILT ANGLE OF A TOUCH-SENSITIVE SURFACE

(71) Applicant: Wacom Co., Ltd., Saitama (JP)

(72) Inventors: David Charles Fleck, Vancouver, WA (US); Robert Charles Cohn, Beaverton, OR (US); Daniel Lee Tower, Vancouver, WA (US); Stephanie Lisa Marguerite Connor, Portland, OR (US)

(73) Assignee: Wacom Co., Ltd., Saitama (JP)

( * ) Notice: Subject to any disclaimer, the term of this patent is extended or adjusted under 35 U.S.C. 154(b) by 114 days.

(21) Appl. No.: 14/673,381

(22) Filed: Mar. 30, 2015

(65) Prior Publication Data
US 2016/0291760 A1  Oct. 6, 2016

(51) Int. Cl.
G06F 3/0346 (2013.01)
G06F 3/0488 (2013.01)
G06F 3/041 (2006.01)
G06F 3/0354 (2013.01)

(52) U.S. Cl.
CPC .......... G06F 3/0414 (2013.01); G06F 3/0346 (2013.01); G06F 3/03545 (2013.01); G06F 3/0416 (2013.01); G06F 3/0488 (2013.01); G06F 2201/81 (2013.01); G06F 2201/86 (2013.01); G06F 2203/04106 (2013.01)

(58) Field of Classification Search
CPC ............... G06F 3/0414; G06F 3/03545; G06F 2203/04106; G06F 2201/86; G06F 2201/81
See application file for complete search history.

(56) References Cited

U.S. PATENT DOCUMENTS

| 7,231,825 B2 | 6/2007 | Davidson |
| 8,482,545 B2 | 7/2013 | King-Smith et al. |
| 8,749,501 B2 | 6/2014 | Oda et al. |
| 8,963,889 B2 | 2/2015 | Oda et al. |
| 9,310,972 B2 * | 4/2016 | Lee ....................... G06F 1/1694 |

(Continued)

OTHER PUBLICATIONS

Extended European Search Report, dated Aug. 11, 2016 for International Application No. EP 16 16 2090, 8 pgs.

*Primary Examiner* — Kumar Patel
*Assistant Examiner* — Amy C Onyekaba
(74) *Attorney, Agent, or Firm* — Seed IP Law Group LLP

(57) ABSTRACT

A computing device receives electronic data generated by a touch-sensitive surface in response to a contact made with the touch-sensitive surface, and a tilt sensor detects a tilt angle of the touch-sensitive surface. The tilt angle is indicative of an angular displacement between a reference plane defined by the touch-sensitive surface in a reference position and a current plane defined by the touch-sensitive surface in a current position. A parameter or other aspect of an automated contact discriminating process is modified based at least in part on the detected tilt angle of the touch-sensitive surface. The contact discriminating process determines whether the contact made with the touch-sensitive surface is intentional or not intentional. In response to determining that the contact is intentional, the electronic data is accepted as valid input for further processing. In response to determining that the contact is not intentional, the electronic data is rejected for further processing.

25 Claims, 9 Drawing Sheets

(56) References Cited

U.S. PATENT DOCUMENTS

| | | | |
|---|---|---|---|
| 2010/0139990 A1* | 6/2010 | Westerman | G06F 3/017 |
| | | | 178/18.03 |
| 2012/0158629 A1 | 6/2012 | Hinckley et al. | |
| 2012/0262407 A1* | 10/2012 | Hinckley | G06F 3/038 |
| | | | 345/173 |
| 2012/0306903 A1* | 12/2012 | Griffin | G06F 1/1694 |
| | | | 345/589 |
| 2013/0300672 A1 | 11/2013 | Griffin | |
| 2013/0300696 A1 | 11/2013 | Haran et al. | |
| 2014/0259712 A1 | 9/2014 | Takahashi et al. | |
| 2015/0277539 A1* | 10/2015 | Chueh | G06F 1/3262 |
| | | | 345/178 |

\* cited by examiner

~ 45° TILT ANGLE

CONTACT DISCRIMINATION USING A TILT ANGLE OF A TOUCH-SENSITIVE SURFACE

BACKGROUND

Technical Field

The present disclosure relates to computing devices and systems that include or operate in communication with a touch-sensitive surface.

Description of the Related Art

Modern computers are increasingly configured to receive and act on input from contact made with a touch-sensitive surface. For example, slate-shaped computers or tablet computers typically have a touch-sensitive display screen. A user may directly touch the screen with his or her finger to provide input to the computer. These computers may also be configured to receive input from a pen device used on the touch-sensitive screen to provide more precise input. With a pen device, a user is typically able to provide more detailed input than by way of touch contact alone. There are also touch-sensitive surfaces such as digitizers, separate from computer displays, that can be communicatively coupled to a computing device to provide input.

Often, when a user interacts with a touch-sensitive surface using a pen device, the user rests his or her hand on the surface while writing with the pen. Such hand contact with the touch-sensitive surface, however, frequently results in unintentional input to the computer, such as stray marks on a display as if the user had intentionally touched the surface with their finger, or inadvertent triggering of gestures, such as scrolling, rotating, or zooming on the display as if the user had intentionally provided multiple touch inputs to the surface. While unintentional contact typically comes from the user's hand that is holding a pen device, unintentional contact may also result from touches by other parts of the user's body such as the wrist or arm, or from objects situated near or on the user such as jewelry. In circumstances where the contact made with a touch-sensitive surface is not intentional, it is necessary to distinguish such contact with the touch-sensitive surface and reject the input resulting from such contact.

BRIEF SUMMARY

The present disclosure provides a variety of methods, systems, and computer readable media for use in distinguishing unintended contact with a touch-sensitive surface and rejecting touch input resulting from such contact. The ability to distinguish or discriminate unintended from intended contact is improved by detecting a tilt angle of the touch-sensitive surface when the contact is made, and modifying the contact discriminating process based at least in part on the detected tilt angle.

As described in greater detail herein, a tilt sensor (such as, but not limited to, an accelerometer device) is capable of detecting a tilt angle of the touch-sensitive surface. The tilt angle of a touch-sensitive surface is indicative of an angular displacement between a reference plane defined by the touch-sensitive surface in a reference position and a current plane defined by the touch-sensitive in a current position (e.g., as illustrated in FIG. 4B). An automated contact discriminating process determines whether the contact made with the touch-sensitive surface is intentional or not intentional. Depending on the detected tilt angle, at least one aspect of the contact discriminating process, such as a parameter or an algorithm step of the contact discriminating process, is modified. In circumstances where the contact made with the touch-sensitive surface is determined to be intentional, electronic data resulting from the intended contact is accepted as output from the touch-sensitive surface for further processing. In circumstances where the contact is determined to be not intentional, electronic data resulting from the unintended contact is rejected as output from the touch-sensitive surface. Generally, in various embodiments, electronic data that is "accepted" is identified as such and processed as valid input, while electronic data that is "rejected" is either immediately discarded or identified as rejected for any further processing.

DETAILED DESCRIPTION

Described herein are methods, systems, and computer readable media for use with a touch-sensitive surface, wherein unintended or intended contact with the touch-sensitive surface is distinguished and electronic data resulting from unintended contact is rejected. One example of a touch-sensitive surface is a digitizer pad that, when contacted by a finger or a pen device, produces electronic data recording information regarding the contact made with the pad. Such electronic data may include, without limitation, position data indicating a location on the pad where the contact was made. The electronic data may further include information indicating temporal characteristics of the contact, such as the time the contact was made, and/or physical characteristics of the contact, such as an amount of pressure the contact made on the pad or the size of the contact area.

Another example of a touch-sensitive surface is a touch-sensitive display in which digitizer circuitry is integrated into or mounted in front of a display screen, such as a liquid crystal display (LCD) screen. A touch-sensitive display is often considered more versatile than a digitizer pad because the user of the display is able to perceive feedback from contact with the digitizer circuitry in the form of marks on the display screen shown adjacent to the point of contact. When a touch-sensitive display is configured to detect contact pressure, the amount of contact pressure may be reflected on the display screen, for example, by way of varying the thickness of the marks on the screen.

Figure 1:
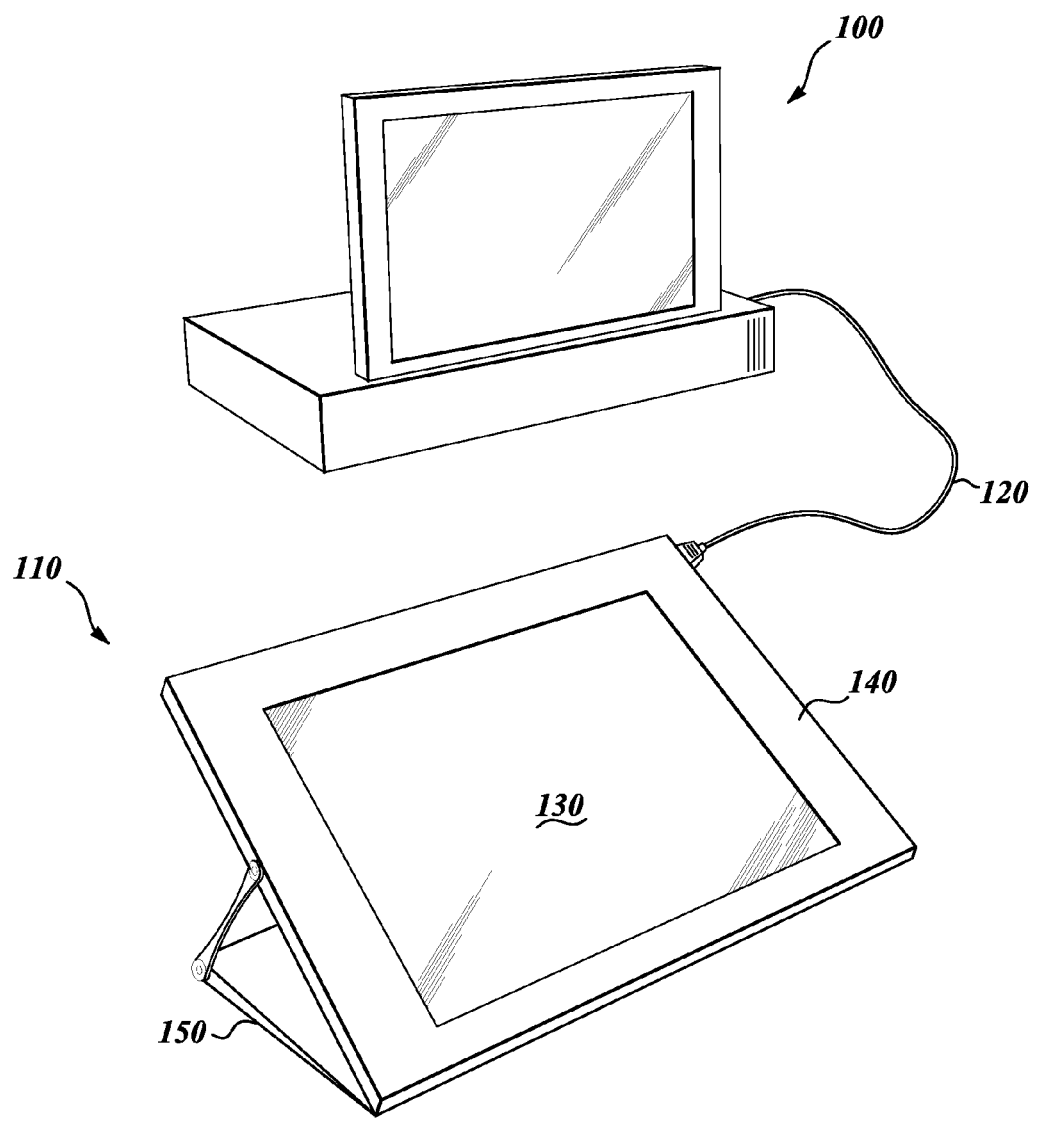
FIG. 1 is a pictorial diagram of a computing device coupled to a touch-sensitive surface capable of sensing both pen and touch contact.

FIG. 1 is a pictorial diagram that illustrates a computing device 100 coupled to a touch-sensitive surface 110. The touch-sensitive surface 110, in this embodiment, is capable of sensing both pen contact and touch contact. One example of a combination touch and transducer input system is found in U.S. Pat. No. 8,482,545, assigned to the assignee of the present invention and incorporated by reference herein. As discussed herein, the term "touch contact" generally refers to contacts made with the touch-sensitive surface by something other than a pen device. Touch contact usually results from a user's finger, palm, or other parts of a user's hand, wrist, arm, or body, that touches the touch-sensitive surface. The term "pen contact" generally refers to contacts made with the touch-sensitive surface by a pen device, typically held in a user's hand.

In the illustrated embodiment, the computing device 100 is coupled to the touch-sensitive surface 110 by way of a cable 120. In other embodiments however, the computing device 100 may be wirelessly coupled to the touch-sensitive surface 110 using, for example, optical or electromagnetic communication circuitry. The coupling of the touch-sensitive surface 110 to the computing device 100 allows electronic data generated by the touch-sensitive surface 110 to be transmitted to the computing device 100 for processing. Such data may include, for example, data generated from contact made with the touch-sensitive surface 110.

In the illustrated embodiment, the touch-sensitive surface 110 includes a pad or screen area 130 surrounded by a frame 140. The frame 140 may provide a housing that includes buttons, switches, and/or ports (e.g., for connecting the cable 120) as appropriate to control operation of the touch-sensitive surface 110. In some embodiments, the touch-sensitive surface 110 may be connected to a stand 150 that holds the touch-sensitive surface 110 at a desired tilt angle relative to a support surface, such as a desktop or a wall. Digitizer circuitry integrated into or mounted in front of the pad or screen area 130 senses pen contact and/or touch contact with the pad or screen area 130. Persons of ordinary skill in the art will readily appreciate that the present disclosure encompasses embodiments other than the particular embodiment illustrated in FIG. 1. For example, processing circuitry of the computing device 100 may be incorporated with the touch-sensitive surface 110 such that the touch-sensitive surface 110 does not transmit data to a separate computing device 100. Instead, the touch-sensitive surface 110 operates as a standalone touch-sensitive computing device, such as a tablet computer, that is capable of sensing, processing, and displaying pen contact and touch contact made with the pad or screen area 130.

Figure 2:
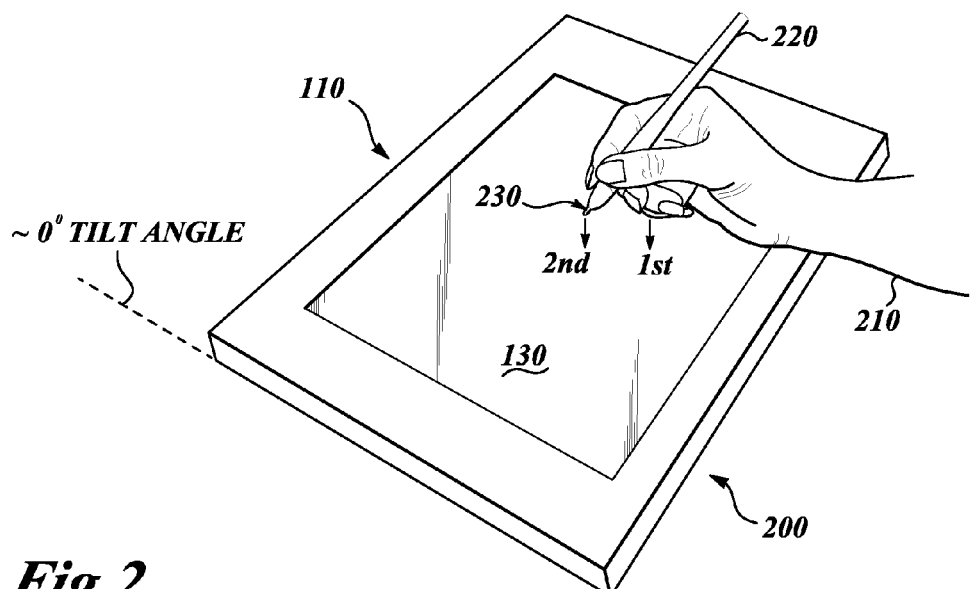
FIG. 2 is a pictorial diagram of a hand with a pen device making contact with a touch-sensitive surface in a position having a tilt angle that is approximately horizontal.

The touch-sensitive surface 110 may be mounted or otherwise set in a desired position for receiving contact from a user. In some circumstances, the touch-sensitive surface 110 may be positioned flat on a support surface, such as a desktop. FIG. 2 illustrates, for example, a touch-sensitive surface 110 in an approximately flat position 200. In a flat position as shown, the touch-sensitive surface 110 is considered as having a tilt angle that is approximately horizontal. Further illustrated in FIG. 2 is a user's hand 210 holding a pen device 220 making contact with the pad or screen area 130 of the touch-sensitive surface 110. While the hand 210 shown in FIG. 2 is a right hand, it should be understood that the present disclosure is equally applicable to circumstances where a user holds the pen device 220 in their left hand.

Figure 3:
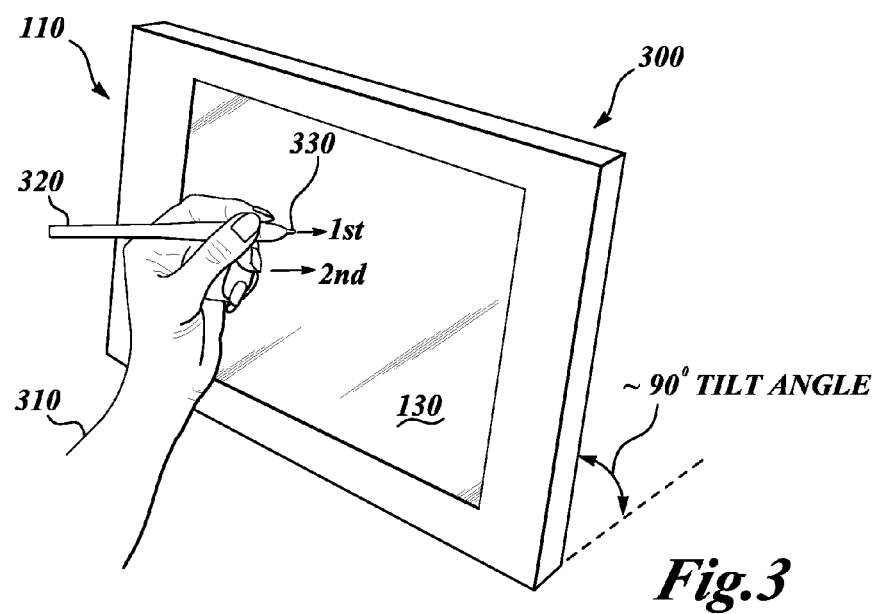
FIG. 3 is a pictorial diagram of a hand with a pen device making contact with a touch-sensitive surface in a position having a tilt angle that is approximately vertical.

In other circumstances, the touch-sensitive surface 110 may be positioned vertically on a support surface such as a wall, or held perpendicular to a support surface such as a desktop. As illustrated in FIG. 3, the touch-sensitive surface 110 is positioned in an approximately upright position 300. In an upright position as shown, the touch-sensitive surface 110 is considered as having a tilt angle that is approximately vertical. Further illustrated in FIG. 3 is a user's hand 310 holding a pen device 320 making contact with the pad or screen area 130 of the touch-sensitive surface 110.

Figure 4A:
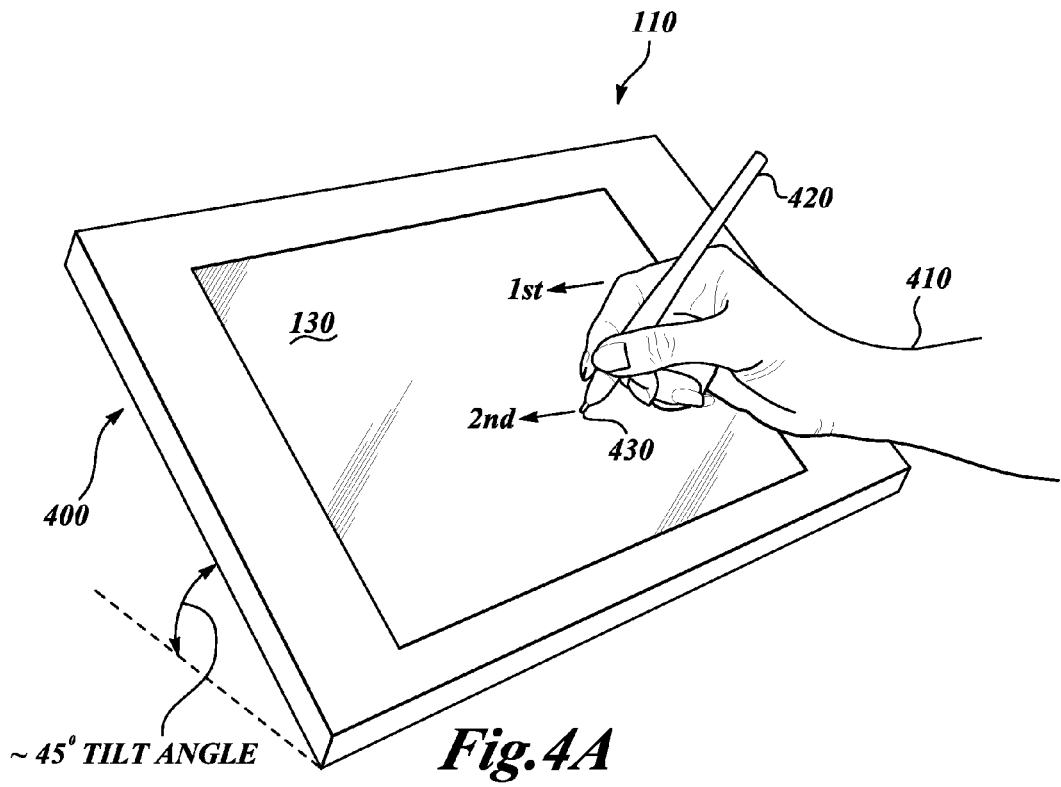
FIG. 4A is a pictorial diagram of a hand with a pen device making contact with a touch-sensitive surface in a position having a tilt angle between approximately horizontal and approximately vertical.

FIG. 4A illustrates yet other circumstances in which a touch-sensitive surface 110 is positioned at an incline 400. In an inclined position as shown, the touch-sensitive surface 110 is considered as having a tilt angle that is between approximately horizontal and approximately vertical. FIG. 4A further illustrates a user's hand 410 with a pen device 420 making contact with the pad or screen area 130 of the touch-sensitive surface 110. The touch-sensitive surface 110 may be resting on an inclined support surface or may otherwise be coupled to a stand 150 and held at an inclined angle, as shown in FIG. 1.

FIGS. 2-4 further demonstrate how a user's hand holding a pen device typically contacts a touch-sensitive surface. When the touch-sensitive surface 110 is approximately horizontal as shown in FIG. 2, the user's hand 210 is typically positioned relative to the pen device 220 such that the user's hand contacts the touch-sensitive surface 110 first, before the tip 230 of the pen device. When the touch-sensitive surface 110 is approximately vertical as shown in FIG. 3, the user's hand 310 is typically positioned relative to the pen device 320 such that the tip 330 of the pen device contacts the touch-sensitive surface before the user's hand 310. When the touch-sensitive surface 110 is in an inclined position between approximately horizontal and approximately vertical as shown in FIG. 4A, portions of the user's hand 410, such as the knuckles, often contact the touch-sensitive surface 110 before the tip 430 of the pen device 420. Because the types and timing of contact made with the touch-sensitive surface 110 may vary according to the tilt angle of the touch-sensitive surface, embodiments of the disclosure described herein are configured to modify one or more aspects of the contact discriminating process based at least in part on the detected tilt angle of the touch-sensitive surface. Such aspects of the contact discriminating process may include parameters and/or algorithm steps used by the contact discriminating process to determine whether contacts made with the touch-sensitive surface are intentional or not intentional.

Briefly stated, according to at least one embodiment, a computing device may receive electronic data generated by a touch-sensitive surface in response to a contact made with the touch-sensitive surface. As previously mentioned herein, the computing device may be separate from the touch-sensitive surface (as illustrated in FIG. 1) or integrated with the touch-sensitive surface. A tilt angle of the touch-sensitive surface is detected by a tilt sensor as described in greater detail below in connection with FIG. 5. The tilt angle is indicative of an angular displacement of the touch-sensitive surface between a reference plane defined by the touch-sensitive surface in a reference position and a current plane defined by the touch-sensitive surface in a current position. For example, turning to FIG. 4B, a reference plane 450 may be defined by the touch-sensitive surface in a horizontal reference position, and the current plane 460 may be defined by the touch-sensitive surface in an inclined current position, rotated about an axis 470 that, for example, may be defined along an edge of the touch-sensitive surface. The tilt angle 480 of the touch-sensitive surface in the current position indicates the angular displacement between the horizontal reference plane 450 and the inclined current plane 460.

Figure 4B:
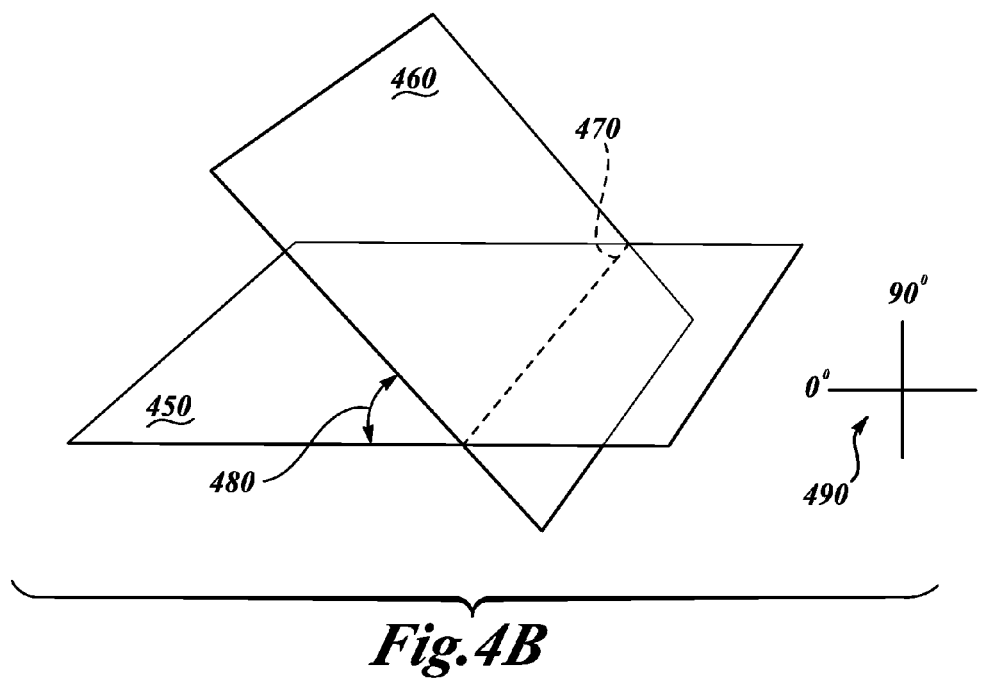
FIG. 4B is a pictorial diagram of an example of a tilt angle between a reference plane and a current plane.

If the tilt angle is considered relative to a reference x-y plane 490 as shown in FIG. 4B, where the horizontal x-axis is represented by 0 degrees and the vertical y-axis is represented by 90 degrees, a touch-sensitive surface at an inclined position between approximately horizontal and approximately vertical, as shown in FIG. 4A, may have a tilt angle of 45 degrees. In cases where the touch-sensitive surface is in a flat orientation, coincident with a horizontal reference plane as illustrated in FIG. 2, the tilt angle is 0 degrees. In cases where the touch-sensitive surface is in a vertical orientation, perpendicular to a horizontal reference plane as illustrated in FIG. 3, the tilt angle is 90 degrees. It should be understood that the preceding illustrations and other embodiments depicted and claimed herein are not necessarily limited to two-dimensional orthogonal reference positions, but instead are merely examples of a more general case in which the tilt angle 480 is represented by a three-dimensional tilt vector [X,Y,Z]).

In various embodiments, the amount of tolerance from 0 degrees to be considered "approximately horizontal" and the amount of tolerance from 90 degrees to be considered "approximately vertical" may vary depending on the precision required for the particular circumstances in which the touch-sensitive surface is used. In some circumstances, a tolerance of plus-or-minus 20 degrees may be acceptable. In that case, the touch-sensitive surface may be positioned at a tilt angle in the range of −20 degrees to +20 degrees, and the tilt angle is "approximately horizontal." Likewise, in that case, the touch-sensitive surface may be positioned at a tilt angle in the range of 70 degrees to 110 degrees, and the tilt angle is "approximately vertical." In other circumstances, greater precision may be required and a tolerance of plus-or-minus 10 degrees or plus-or-minus 5 degrees, for example, may be acceptable. In the case of a tolerance of plus-or-minus 5 degrees, the touch-sensitive surface may be positioned at a tilt angle in the range of −5 degrees to +5 degrees and the tilt angle is "approximately horizontal," while if the touch-sensitive surface is positioned at a tilt angle in the range of 85 degrees to 95 degrees, the tilt angle is "approximately vertical."

Tolerance ranges for assessing the tilt angle of a touch-sensitive surface may also take into account circumstances in which the touch-sensitive surface is held at an oblique angle to a reference plane. In such circumstances, tilt sensors as described herein are still capable of providing data indicative of a tilt angle of the touch-sensitive surface and embodiments of the present disclosure are equally capable of modifying an algorithm step or parameter of an automated contact discriminating process based at least in part on the detected tilt angle of the touch-sensitive surface.

In accordance with the present disclosure, the tilt angle of the touch-sensitive surface influences the process and/or parameters that are used to discriminate unintended contact from intended contact. At least one aspect of an automated contact discriminating process, such as a parameter or an algorithm step, is modified based at least in part on the detected tilt angle.

The contact discriminating process thereafter determines whether the contact made with the touch-sensitive surface is intentional or not intentional to convey input to the computing device via the touch-sensitive surface. In response to determining that the contact made with the touch-sensitive surface is intentional, the electronic data generated by the touch-sensitive surface is accepted as output from the touch-sensitive surface for further processing. If the contact made with the touch-sensitive surface is determined to be not intentional, the electronic data is rejected and is not considered as valid input from the touch-sensitive surface.

Generally, various techniques may be used to identify and reject unintentional contact with a touch-sensitive surface. In one technique, the touch-sensitive surface is capable of sensing the presence of a pen device before the pen device contacts the touch-sensitive surface. For example, a position detection apparatus may use electrostatic coupling in which a signal is transmitted from a pen device to a sensor section that detects the position pointed to by the pen device. See, e.g., U.S. Pat. Nos. 8,963,889 and 8,749,501, assigned to the assignee of the present invention and incorporated by reference herein. With this technique, the touch-sensitive surface may distinguish and accept contact made by the pen device and disable or reject all touch contact from further processing. However, rejecting all touch contact when a pen device is present prevents the user or touch-sensitive applications or operating systems running on a computing device from using touch interactions with the touch-sensitive surface when a pen device is in use.

Another technique to identify and reject unintentional touch contact is to ignore all initial touch contact with the touch-sensitive surface. With this technique, the touch-sensitive surface seeks to determine whether a pen device is present, and if a pen device appears in proximity to the touch-sensitive surface within a predetermined time of the initial touch contact, the contact data continues to be discarded. This technique may be useful when the touch-sensitive surface is in an approximately horizontal or inclined position when a user's hand is more likely to touch the touch-sensitive surface before a pen device. A disadvantage of delaying acceptance of intentional touch data is that latency is added to the processing of all touch contact with the touch-sensitive surface and may cause the touch-sensitive surface to appear less responsive.

Yet another technique to identify and reject unintentional touch contact is to ignore all touch contact with the touch-sensitive surface in which a measured size of the touch contact is too large to represent an intended contact. For example, when a touch-sensitive surface is positioned in an approximately horizontal position, the palm of a user's hand, which represents a large area, may tend to contact the touch-sensitive surface first. In contrast with an unintended palm touch of the touch-sensitive surface, an intended touch of the touch-sensitive surface by a user's fingertip appears as a much smaller area of contact.

Yet another technique to identify and reject unintentional touch contact is one in which new contacts with the touch-sensitive surface are evaluated for proximity to a detected contact of a pen device. Contacts that appear in the vicinity of, or proximate to, a pen device are ignored or otherwise rejected. Still another technique for identifying and rejecting unintentional touch contact evaluates the proximity of a contact in question to other contacts that have previously been determined to be intentional or unintentional.

Techniques that use fixed size areas in all circumstances for evaluating contacts or proximity of contacts and distinguishing unintentional contacts from intentional contacts may lead to a greater number of false acceptance or false rejection of contact data, depending on the size of contact or proximity area that is established. As described herein, the process of discriminating intentional contact from unintentional contact is improved by modifying the contact discriminating process based at least in part on a detected tilt angle of the touch-sensitive surface.

Figure 5:
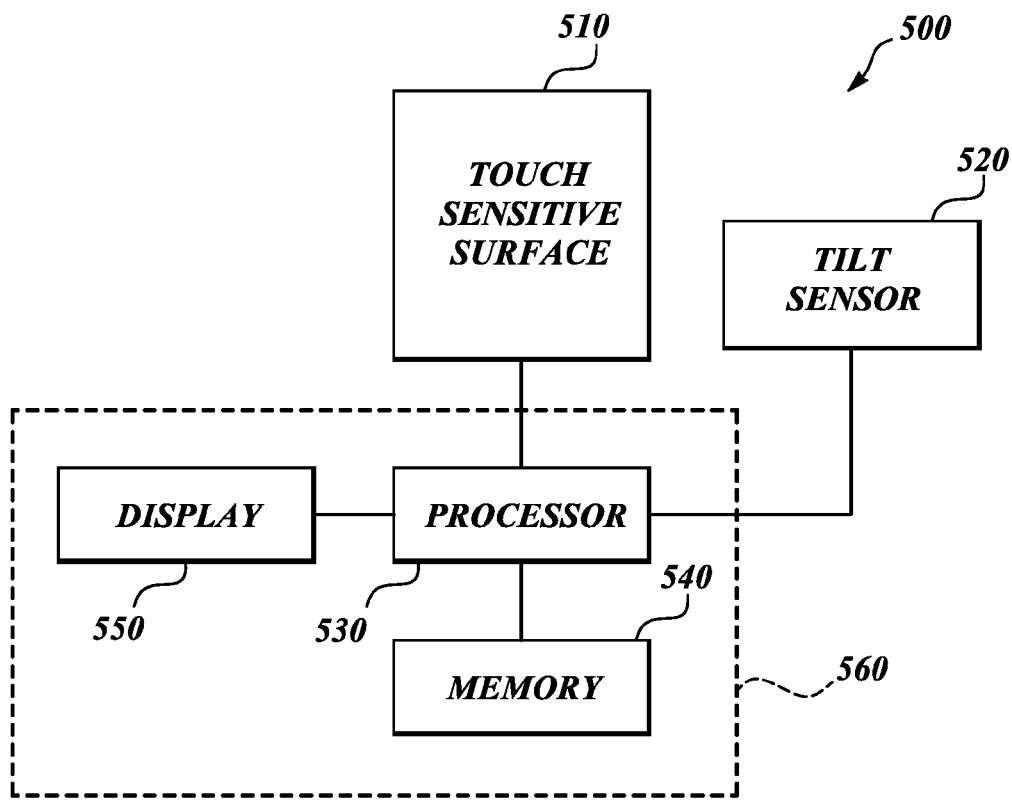
FIG. 5 is a block diagram illustrating an embodiment of a system with a touch-sensitive surface and a tilt sensor in communication with a processor configured to conduct a contact discriminating process as described herein.

FIG. 5 is a block diagram that illustrates at least one implementation of a system 500 that includes a touch-sensitive surface 510 and a tilt sensor 520 in communication with a processor 530 of a computing device 560. The processor 530 is coupled to a memory 540 and is configured to conduct a contact discriminating process as described herein in accordance with processing logic of the system 500. In this particular implementation, the processing logic is embodied in computer-executable instructions stored in the memory 540. The memory 540 thus provides one example of a non-transitory computer readable storage medium comprising computer-executable instructions stored thereon. In some implementations, the computer-executable instructions providing the processing logic may be a software driver operable in connection with the touch-sensitive surface 510. In other implementations, the processing logic for directing the operation of the system 500 may be embodied in wired logic devices or programmable logic devices.

In response to execution of the computer-executable instructions by the processor 530, the instructions cause the computing device 560 to conduct operations such as a contact discriminating process as described herein. An optional display 550 may also be coupled to the processor 530 for displaying output from the processor 530. For example, the display 550 may comprise a display screen configured to show one or more marks corresponding to contact made with the touch-sensitive surface 510.

In various embodiments, the processor 530, memory 540, and display 550 may collectively be configured as a computing device 560 that is separate from the touch-sensitive surface 510. In such embodiments, contact data generated by the touch-sensitive surface 510 is communicated through an external wired or wireless connection with the processor 530. In other embodiments, the touch-sensitive surface 510 may be integrated with the computing device 560 such that contact data generated by the touch-sensitive surface 510 is internally communicated to the processor 530 of the computing device.

In yet other embodiments, the touch-sensitive surface 510 may include an internal processor and internal memory, separate from the processor 530 and memory 540 of the computing device 560. The processing logic that provides the contact discriminating process may be executed by the internal processor based on instructions stored in the internal memory. The results of the internal processing may then be communicated to the processor 530 of the computing device 560. In other cases, the optional display 550 may be coupled to the touch-sensitive surface 510, and the results of the internal processing performed by the touch-sensitive surface may be shown on the display 550.

The tilt sensor 520 is configured to detect a current tilt angle of the touch-sensitive surface 510. Depending on the configuration of the tilt sensor 520, the tilt sensor 520 may be separate from the touch sensitive surface 510 and/or the computing device 560, or the tilt sensor 520 may be integrated with the touch sensitive surface 510 or the computing device 560.

Suitable sensors for detecting a current tilt angle of a device, such as a touch sensitive surface, are known in the art. For example, a suitable tilt sensor may include one or more accelerometers that are capable of sensing the position of a device along different axes relative to the downward pull of gravity, e.g., as described in U.S. Pat. No. 7,231,825, the disclosure of which is incorporated by reference herein. Other suitable tilt sensors may include one or more potentiometers, magnetic devices, or liquid-filled tubes capable of sensing an inclined position of a device, e.g., as described in U.S. Pre-Grant Publication No. 2014/0259712, the disclosure of which is incorporated by reference herein. Depending (at least in part) on a detected tilt angle of the touch-sensitive surface, the contact discriminating process used to evaluate contacts made with the touch-sensitive surface is modified.

FIG. 5 thus illustrates an example of a system comprising a computing device including processing logic, a touch-sensitive surface in communication with the computing device, and a tilt sensor adapted to detect a tilt angle of the touch-sensitive surface, wherein the tilt angle is indicative of an angular displacement between a reference plane defined by the touch-sensitive surface in a reference position and a current plane defined by the touch-sensitive surface in a current position. As discussed above, the processing logic causes the computing device to receive electronic data generated by the touch-sensitive surface in response to a contact made with the touch-sensitive surface, detect, by the tilt sensor, a tilt angle of the touch-sensitive surface, modify at least one aspect of an automated contact discriminating process based at least in part on the detected tilt angle of the touch-sensitive surface, and determine, by the contact discriminating process, whether the contact made with the touch-sensitive surface is intentional or not intentional to convey input via the touch-sensitive surface. The electronic data is accepted as output from the touch-sensitive surface for further processing in response to determining that the contact made with the touch-sensitive surface is intentional. Otherwise, in response to determining that the contact made with the touch-sensitive surface is not intentional, the electronic data is rejected and not considered as valid input from the touch-sensitive surface.

FIGS. 6-10 provide flow diagrams of various embodiments of a contact discriminating process that may be conducted by the computing device 560 using electronic data received from the touch-sensitive surface 510 and tilt angle information received from the tilt sensor 520. In various embodiments, until the contact discriminating process determines that a contact made with the touch-sensitive surface is intentional, the contact discriminating process may be configured to reject electronic data generated by the touch-sensitive surface as a result of the contact with the touch-sensitive surface.

Figure 6:
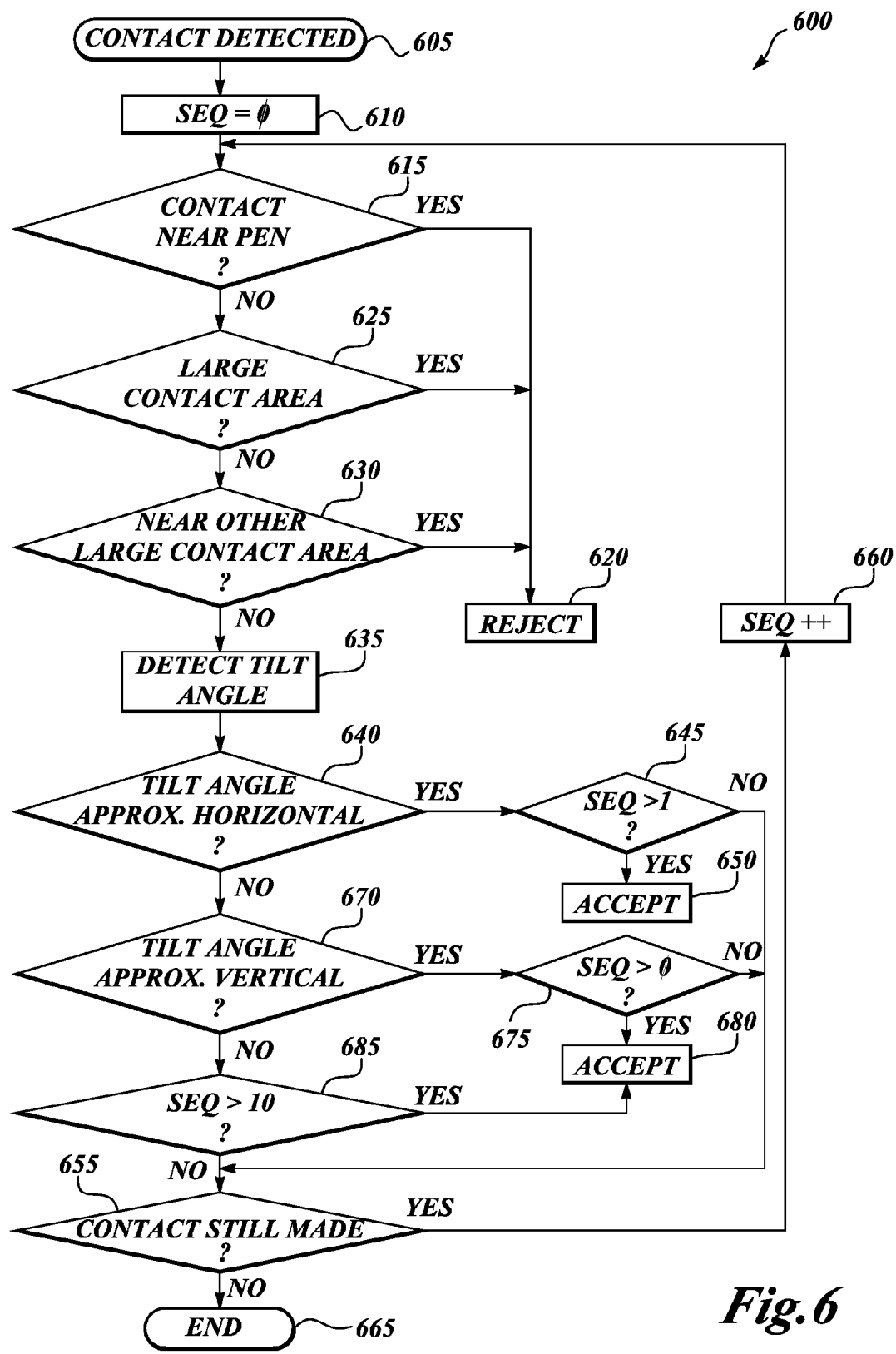
FIG. 6 is a flow diagram of a contact discriminating process according to a first exemplary embodiment described herein.

FIG. 6 provides a flow diagram of a contact discriminating process 600 according to a first exemplary embodiment. In this particular embodiment, a contact made with the touch-sensitive surface causes the touch-sensitive surface to generate electronic data as a sequence of data records indicative of the contact made. The number of data records generated by the touch-sensitive surface and received by the contact discriminating process 600 is monitored while the contact made with the touch-sensitive surface remains continuous. The contact discriminating process in this particular embodiment determines that the contact made with the touch-sensitive surface is intentional when (or in response to) the monitored number of data records reaches or exceeds a threshold number of data records. As will be appreciated from the following description, the number of data records used by the contact discriminating process 600 as the threshold number of data records to distinguish intentional from unintentional contact may be modified depending at least in part on a detected tilt angle of the touch-sensitive surface.

Generally, a contact discriminating process is executed during the period of time in which the contact with the touch-sensitive surface is not known to be intentional or unintentional. Once the contact with the touch-sensitive surface is determined to be intentional or unintentional, the state of the contact is fixed and the contact discriminating process is no longer executed for the contact. Electronic data generated by the touch-sensitive surface as a result of the contact is accepted or rejected depending on the determined state of the contact.

As illustrated in FIG. 6, the process 600 begins at block 605 where contact with the touch-sensitive surface is initially detected. At block 610, a sequence counter (SEQ) that counts the generated data records is set equal to zero. Subsequently, at decision block 615, the process 600 determines whether the contact made with the touch-sensitive surface is proximate to or near a known position of a pen device. If the contact is near the position of a pen device, the contact is determined to be not intentional, and electronic data generated as a result of the contact is rejected, as indicated at block 620. Accordingly, when a touch contact is made near a pen device, the data records resulting from the touch contact are rejected and are not considered as valid input resulting from intentional contact with the touch-sensitive surface. As will be appreciated from further discussion below, the size and/or location of the area of the touch-sensitive surface considered to be near a pen device may be modified based on a detected tilt angle of the touch-sensitive surface.

If the contact made with the touch-sensitive surface is not near the position of a pen device, the process 600 proceeds to decision block 625 where the process 600 determines whether the size of the contact is too large for the contact to be considered an intentional contact. For example, a finger contacting the touch-sensitive surface typically contacts a portion of the surface smaller than a palm contacting the surface. If a finger contact is considered to be intentional and a palm contact is considered not intentional, the evaluation conducted at the decision block 625 is capable of discriminating between intentional and unintentional contact. If the contact with the touch-sensitive surface is determined to be too large, the process 600 proceeds to block 620 where the contact is determined to be not intentional and the generated data records associated with the contact are rejected. On the other hand, if the contact made with the touch-sensitive surface is determined to be sufficiently small, the process 600 proceeds to decision block 630.

At decision block 630, the contact discriminating process 600 evaluates whether the contact made with the touch-sensitive surface is near another area of contact considered to be too large to be an intentional contact. For example, if contact made by a user's knuckle appears to be separate from but near contact made by the user's palm, and contact by the user's palm is considered to be too large to be intentional (and therefore rejected), the contact by the user's knuckle may likewise be determined at block 620 to be not intentional and be rejected.

If the contact made with the touch-sensitive surface is not near another area of contact considered to be too large, the process 600 proceeds to block 635 where the tilt sensor 520 (see FIG. 5) detects the tilt angle of the touch-sensitive surface. Information regarding the tilt angle is received by the contact discriminating process 600, and at decision block 640, the process 600 evaluates whether the tilt angle indicates that the touch-sensitive surface is currently in an approximately horizontal position. More precisely, in this embodiment, the process 600 evaluates whether the tilt angle indicates that a current plane defined by the touch-sensitive surface in its current position is approximately horizontal. If so, the process 600 proceeds to decision block 645 where the number of data records generated by the touch-sensitive surface as a result of the contact is evaluated.

As mentioned earlier, a sequence counter (SEQ) monitors the number of data records received from the touch-sensitive surface while the contact made with the touch-sensitive surface remains continuous. At decision block 645, if the sequence counter indicates (in this particular embodiment) that more than two data records have been received (i.e., SEQ>1), the contact made with the touch-sensitive surface is determined to be intentional and, as indicated at block 650, the data records resulting from the contact are accepted as output from the touch-sensitive surface for further processing. If, at decision block 645, the sequence counter indicates (in this particular embodiment) that two or fewer data records have been received (i.e., where SEQ=0 and SEQ=1, respectively), the data records are ignored and the process 600 proceeds to decision block 655 where it is determined whether the contact is still being made with the touch-sensitive surface. If the contact is no longer detected, the process 600 ends at block 665.

Of course, while the particular embodiment in FIG. 6 and other embodiments shown in other figures are illustrated using specific numerical thresholds (e.g., "more than two" data records or "two or fewer" data records in FIG. 6), it should be understood that other numerical thresholds may be used in yet other embodiments to discriminate intentional from unintentional contact.

Returning to decision block 640, if the tilt angle does not indicate that the touch-sensitive surface is currently in an approximately horizontal position, the process 600 proceeds to decision block 670 where the process 600 evaluates the tilt angle to determine whether the touch-sensitive surface is currently in an approximately vertical position. More precisely, the process 600 evaluates whether the tilt angle indicates that the current plane defined by the touch-sensitive surface in its current position is approximately vertical. If so, the process 600 proceeds to decision block 675 where the number of data records generated by the touch-sensitive surface as a result of the contact is evaluated. At decision block 675, if the sequence counter indicates that more than one data record has been received (i.e., SEQ>0), the contact made with the touch-sensitive surface is determined to be intentional and the data records resulting from the contact are accepted as output from the touch-sensitive surface for further processing, as indicated at block 680. If, at decision block 675, the sequence counter indicates that only one data record has been received (i.e., where SEQ=0), the data record is ignored and the process 600 proceeds to decision block 655 where the process determines whether the contact is still being made with the touch-sensitive surface. In this embodiment and elsewhere, it should be understood that the contact "still being made" refers to the same identifiable contact being evaluated by the contact discriminating process, from initial detection of the contact to the point at which the contact is no longer detected or the contact discriminating process has ended. Often, to distinguish different contacts from one another, a contact identifier is assigned to each contact at the time of initial detection of the contact.

If, at decision block 670, the tilt angle does not indicate that the touch-sensitive surface is in an approximately vertical position, the process 600 may assume that the touch-sensitive surface is in an inclined position between approximately horizontal and approximately vertical. In this circumstance, the process 600 proceeds to decision block 685 where the number of data records generated by the touch-sensitive surface as a result of the contact is evaluated. If the sequence counter indicates more than eleven data records been received (i.e., SEQ>10), the contact made with the touch-sensitive surface is determined to be intentional and the data records resulting from the contact are accepted as output from the touch-sensitive surface for further processing, as indicated at block 680. If, at decision block 685, the sequence counter indicates that eleven or fewer data records have been received, the data records are ignored and the process 600 proceeds to decision block 655 where the process determines whether the contact is still being made with the touch sensitive surface. As mentioned earlier, the specific numerical thresholds in this example (e.g., "more than eleven" data records or "eleven or fewer" data records) are used for illustration only and are not limiting. Other numerical thresholds may be used in yet other embodiments to discriminate intentional from unintentional contact.

In all instances at decision block 655 where the process 600 determines that the contact is still being made, the process 600 proceeds to block 660 where the sequence counter is incremented for evaluation of the next data record received from the touch-sensitive surface. The process 600 then returns to decision block 615 where the above-described processing is repeated for the next data record. Eventually, the contact discriminating process 600 results in the determination that the contact is either intentional or not intentional, and the data records generated by the touch-sensitive surface as a result of the contact are either accepted or rejected.

As can be appreciated from the process 600 illustrated in FIG. 6, the acceptance of data records resulting from contact made with the touch-sensitive surface depends on whether the number of data records received from the touch sensitive surface has reached or exceeded a threshold number of data records. The threshold number of data records used by the process 600 depends at least in part on the detected tilt angle of the touch-sensitive surface. Accordingly, the process 600 allows for modification of the threshold number of data records (as a parameter of the contact discriminating process) based on the detected tilt angle of the touch-sensitive surface.

If the tilt angle indicates that the touch-sensitive surface is approximately vertical, data records in the sequence of data records after the initial data record are accepted for processing. This is because, when the touch-sensitive surface is an approximately vertical position, a pen device held by a user typically approaches the touch-sensitive surface and contacts the touch-sensitive surface before the user's hand, and less time is needed to evaluate whether the contact made with the touch-sensitive surface is intentional.

If the tilt angle indicates that the touch-sensitive surface is in an approximately horizontal position, up to two data records are evaluated (in this particular embodiment) before the data records resulting from the contact are accepted. This is because, in a horizontal position, the user's palm typically approaches the touch-sensitive surface and contacts the tilt-sensitive surface before a pen device, and the palm contact is quickly rejected due to its large size.

If the tilt angle indicates that the touch-sensitive surface is at an inclined position between approximately horizontal and approximately vertical, up to eleven data records are evaluated (in this particular embodiment) before the data records resulting from the contact are accepted. This is because, when the touch-sensitive surface is in an inclined position, the knuckles of the user's hand typically contact the touch-sensitive surface first and, being similar in size to fingers, are easily confused with finger contact (which is considered to be intentional). Therefore, when the touch-sensitive surface is in an inclined position, the contact discriminating process requires additional time to determine whether a pen device is about to be used.

As can be seen, with the embodiment shown in FIG. 6, a tilt angle of the touch-sensitive surface indicating that the current plane of the touch-sensitive surface is between approximately horizontal and approximately vertical (detected with respect to a reference plane that is approximately horizontal), the threshold number of data records S(m) used by the contact discriminating process 600 is modified to be higher than the threshold number of data records S(h) or S(v) that would be used by the contact discriminating process 600 if the tilt angle had indicated that the current plane of the touch-sensitive surface is approximately horizontal or approximately vertical. In other circumstances, when the reference plane is approximately horizontal and the tilt angle indicates that the current plane of the touch-sensitive surface is approximately vertical, the threshold number of data records S(v) used by the contact discriminating process 600 is modified to be less than the threshold number of data records S(h) that would be used by the contact discriminating process 600 if the tilt angle had indicated the current plane of the touch-sensitive surface is approximately horizontal. By modifying the threshold number of data records S according to a detected tilt angle of the touch-sensitive surface 600, latency in the contact discriminating process causing poor user interface responsiveness can be reduced.

Generally, contact with a touch-sensitive surface causes the touch-sensitive surface to generate data records at a constant rate (e.g., at a sampling rate used by the contact detecting circuitry of the touch-sensitive surface). Accordingly, the use of a threshold number of data records as illustrated in FIG. 6 is related to use of a threshold amount of time that contact is made with the touch-sensitive surface. In an alternative embodiment, the contact discriminating process 600 may use a threshold amount of time instead of a threshold number of data records, as a parameter or aspect of the contact discriminating process that can be modified based on a detected tilt angle of the touch-sensitive surface. In this embodiment, the contact discriminating process determines that the contact made with the touch-sensitive surface is intentional in response to the monitored amount of time reaching or exceeding the threshold amount of time.

In circumstances where a threshold amount of time T is used as a parameter, the contact discriminating process 600 monitors the amount of time the contact is continuously made with the touch-sensitive surface. Instead of a sequence counter, the contact discriminating process 600 may use a time counter that, at block 610, is set to zero to reflect the duration at the beginning of the contact. Thereafter, the contact discriminating process 600 shown in FIG. 6 may be conducted identically to that described above, except in decision blocks 645, 675, and 685, different threshold amounts of time T(h), T(m), or T(v) are used to determine whether to accept or reject the electronic data generated by the touch-sensitive surface as a result of the contact.

In some circumstances, when the tilt angle of the touch-sensitive surface (detected with respect to a reference plane that is approximately horizontal) indicates that the current plane of the touch-sensitive surface is between approximately horizontal and approximately vertical, the threshold amount of time T(m) used by the contact discriminating process 600 is modified to be higher than the threshold amount of time T(h) or T(v) that would be used by the contact discriminating process 600 if the tilt angle had indicated that the current plane of the touch-sensitive surface is approximately horizontal or approximately vertical. In other circumstances, when the reference plane is approximately horizontal and the tilt angle indicates that the current plane of the touch-sensitive surface is approximately vertical, the threshold amount of time T(v) used by the contact discriminating process 600 is modified to be less than the threshold amount of time T(h) that would be used by the contact discriminating process 600 if the tilt angle had indicated the current plane of the touch-sensitive surface is approximately horizontal.

Figure 7:
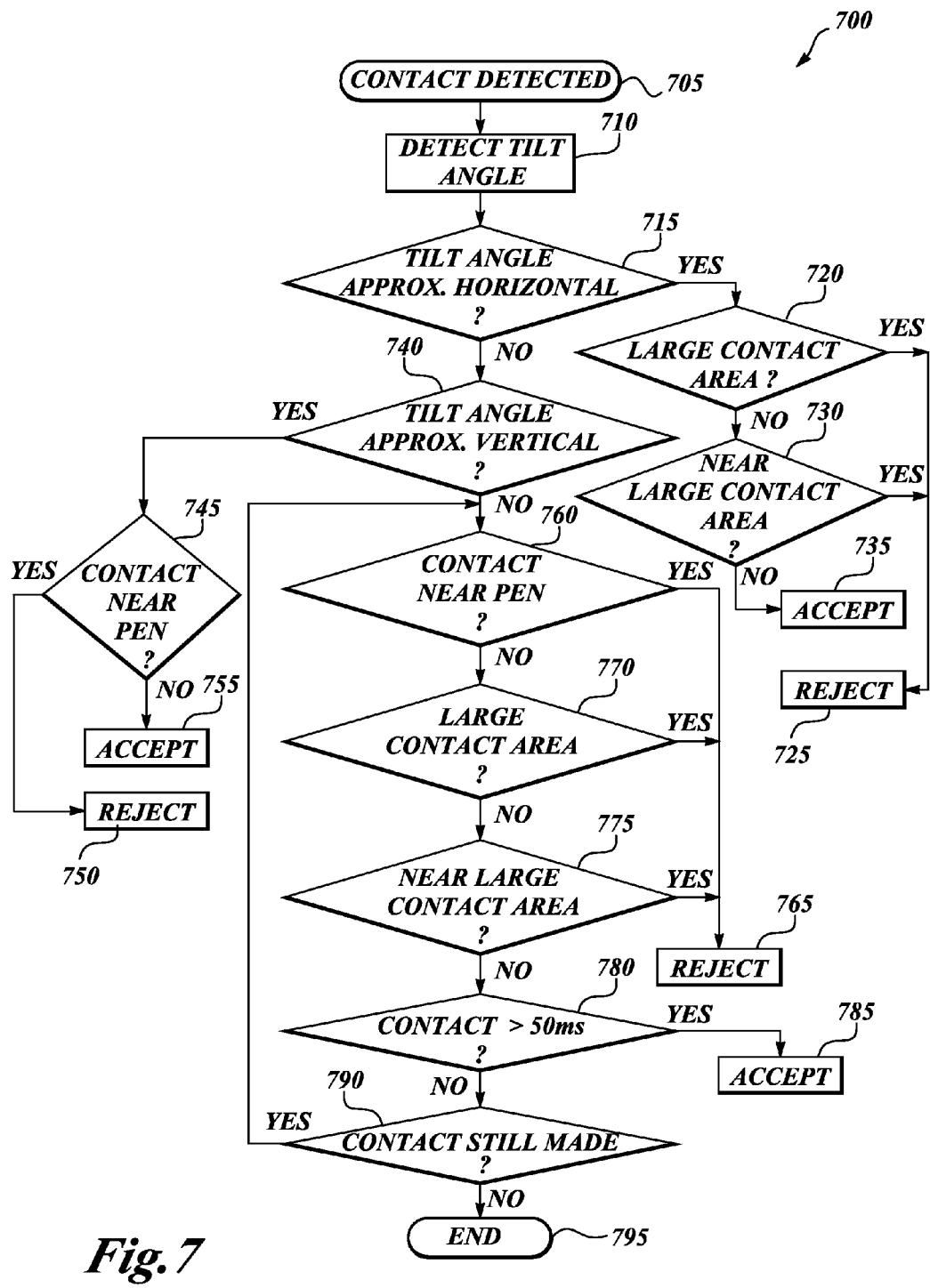
FIG. 7 is a flow diagram of a contact discriminating process according to a second exemplary embodiment described herein.

FIG. 7 is a flow diagram of another contact discriminating process 700 conducted according to a second exemplary embodiment of the present disclosure. In this embodiment, the contact discriminating process 700 is modified to execute one or more different algorithm steps, depending on the detected tilt angle of the touch-sensitive surface, to determine whether the contact made with the touch-sensitive surface is intentional or not intentional. As will be seen from the following description, in circumstances where the tilt angle indicates that the current plane of the touch-sensitive surface is approximately vertical (measured with respect to a reference plane that is approximately horizontal), processing logic conducting the contact discriminating process 700 causes execution of algorithm steps that evaluate the electronic data to determine whether the contact made with the touch-sensitive surface is near a point of contact of a pen device on the touch-sensitive surface. If the contact made with the touch-sensitive surface is not near a point of contact of a pen device, the contact discriminating process 700 determines that the contact is intentional. If the contact made with the touch-sensitive surface is near a point of contact of a pen device, the contact discriminating process determines that the contact is not intentional.

In circumstances where the reference plane is approximately horizontal and the detected tilt angle indicates that the current plane of the touch-sensitive surface is also approximately horizontal, processing logic conducting the contact discriminating process 700 causes execution of algorithm steps that (1) evaluate the electronic data to determine whether a spatial size of the contact made with the touch-sensitive surface reaches or exceeds a threshold size, and if this determination is positive, the contact discriminating process 700 determines that the contact is not intentional, and (2) evaluate the electronic data to determine whether the contact made with the touch-sensitive surface is near another contact on the touch-sensitive surface having a spatial size exceeding a threshold size, and if this determination is positive, the contact discriminating process determines that the contact made is not intentional. Otherwise, if the determination in the algorithm steps (1) and (2) of this paragraph is negative, the contact discriminating process 700 determines that the contact made is intentional.

In circumstances where the reference plane is approximately horizontal and the detected tilt angle indicates that the current plane of the touch-sensitive surface is between approximately horizontal and approximately vertical, processing logic conducting the contact discriminating process 700 causes execution of algorithm steps that (1) evaluate the electronic data to determine whether the contact made with the touch-sensitive surface is near a point of contact of a pen device on the touch-sensitive surface, and if the determination is positive, the contact discriminating process 700 determines that the contact is not intentional; (2) evaluate the electronic data to determine whether a spatial size of the contact reaches or exceeds a threshold size, and if the determination is positive, the contact discriminating process 700 determines that the contact is not intentional; and (3) evaluate the electronic data to determine whether the contact made with the touch-sensitive surface is near another contact on the touch-sensitive surface having a spatial size reaching or exceeding a threshold size, and if the determination is positive, the contact discriminating process 700 determines that the contact is not intentional.

If the determination in the algorithm steps (1), (2), and (3) of the foregoing paragraph is negative, the processing logic causes execution of a further algorithm step that (4) evaluates an amount of time that (or number of data records in which) the contact is continuously made with the touch-sensitive surface. If the amount of time (or number of data records) has reached or exceeded a threshold, the contact discriminating process determines that the contact is intentional. Otherwise, the processing logic causes repeated execution of the algorithm steps (1) to (4) using more-recently generated electronic data in response to the contact made with the touch-sensitive surface.

Where data records from contact made with a touch-sensitive surface are generated at a regular rate, a measurement of the number of data records can be used equivalently as a measurement of time. Accordingly, in this embodiment, an algorithm step that evaluates the number of data records and compares the number of data records to a threshold should be considered equivalent to an algorithm step that evaluates an amount of time and compares the amount of time to a threshold, as described above and in FIG. 7.

The contact discriminating process 700 illustrated in FIG. 7 begins at block 705 where a contact with the touch-sensitive surface is initially detected. At block 710, the tilt sensor 520 (FIG. 5) detects the tilt angle of the touch-sensitive surface. Information regarding the tilt angle is received by the contact discriminating process 700, and at decision block 715, the process 700 evaluates whether the tilt angle indicates that the touch-sensitive surface is currently in an approximately horizontal position. More precisely, in this embodiment, the process 700 evaluates whether the tilt angle indicates that the current plane defined by the touch-sensitive surface in its current position is approximately horizontal. If so, the process 700 proceeds to decision block 720 where the process 700 determines whether the size of the contact is too large for the contact to be considered an intentional contact. Compare, for example, the processing conducted at decision block 625 shown in FIG. 6. If the contact with the touch-sensitive surface is determined to be too large, the process 700 proceeds to block 725 where the contact is determined to be not intentional and the electronic data generated in association with the contact is rejected. On the other hand, if the contact made with the touch-sensitive surface is determined to be sufficiently small, the process 700 proceeds to decision block 730.

At decision block 730, the contact discriminating process 700 evaluates whether the contact made with the touch-sensitive surface is near another area of contact considered to be too large to be an intentional contact. Compare, for example, the processing conducted at decision block 630 shown in FIG. 6. If the contact made with the touch-sensitive surface is not near another area of contact considered to be too large, the process 700 proceeds to block 735 where the contact with the touch-sensitive surface is determined to be intentional and the electronic data generated by the touch-sensitive surface is accepted as output from the touch-sensitive surface for further processing. Otherwise, if the contact made is near another area of contact considered to be too large, the process 700 proceeds to block 725 where the contact is determined to be not intentional and the electronic data generated in association with the contact is rejected for further processing.

Returning to decision block 715, if the tilt angle does not indicate that the current plane of the touch-sensitive surface is approximately horizontal, the process 700 proceeds to decision block 740 where the process 700 evaluates whether the tilt angle indicates that the touch-sensitive surface is currently in an approximately vertical position. More precisely, the process 700 evaluates whether the tilt angle indicates that the current plane defined by the touch-sensitive surface in its current position is approximately vertical. If so, the process 700 proceeds to decision block 745 where the process 700 determines whether the contact made with the touch-sensitive surface is proximate to or near a known position of a pen device. If the contact is near the position of a pen device, the contact is determined to be not intentional and electronic data generated as a result of the contact is rejected as indicated at block 750. Thus, when a touch contact is made near a pen device, the electronic data resulting from the touch contact is rejected and is not considered as valid input from the touch-sensitive surface.

If the contact made with the touch-sensitive surface is not near the position of a pen device, the process 700 proceeds from decision block 745 to block 755 where the contact is determined to be intentional and the electronic data generated by the touch-sensitive surface is accepted and considered as valid input for further processing. As should be appreciated from the present disclosure, the size and location of the area considered to be near a pen device may be modified based on the detected tilt angle of the touch-sensitive surface.

If, at decision block 740, the tilt angle does not indicate that the touch-sensitive surface is in an approximately vertical position, the process 700 assumes that the touch-sensitive surface is in an inclined position between approximately horizontal and approximately vertical. In this circumstance, the process 700 proceeds to decision block 760 where the process 700 determines whether the contact made with the touch-sensitive surface is proximate to or near a known position of a pen device. Compare, for example, the processing described above with respect to decision block 745. If the contact is near the position of a pen device, the contact is determined to be not intentional and electronic data generated as a result of the contact is rejected as indicated at block 765.

If the contact made with the touch-sensitive surface is not near the position of a pen device, the process 700 proceeds from decision block 760 to decision block 770 where the process 700 determines whether the size of the contact is too large for the contact to be considered an intentional contact. Compare, for example, the processing described above with respect to decision block 720. If the contact with the touch-sensitive surface is determined to be too large, the process 700 proceeds to block 765 where the contact is determined to be not intentional and the electronic data generated by the touch-sensitive surface is rejected.

On the other hand, if the contact made with the touch-sensitive surface is determined to be sufficiently small, the process 700 proceeds to decision block 775 where the contact discriminating process 700 evaluates whether the contact made with the touch-sensitive surface is near another area of contact considered to be too large to be an intentional contact. Compare, for example, the processing described above with respect to decision block 730. If the contact made with the touch-sensitive surface is near another area of contact considered to be too large, the process 700 proceeds to block 765 where the contact is determined to be not intentional and the electronic data generated by the touch-sensitive surface is rejected. Otherwise, if the contact made is not near another area of contact considered to be too large, the process 700 proceeds to decision block 780.

At decision block 780, the process 700 evaluates the duration of the contact with the touch-sensitive surface. As described earlier herein, a system conducting the process 700 may monitor the amount of time the contact is continuously made with the touch-sensitive surface using a time counter. At decision block 780, if the amount of time of the contact exceeds 50 ms, the process 700 proceeds to block 785 where the contact is determined to be intentional and the electronic data generated by the touch-sensitive surface is accepted for further processing. On the other hand, if the amount of time of the contact is less than 50 ms, the process 700 ignores the electronic data generated by the touch-sensitive surface and, at decision block 790, evaluates whether the contact is still being made with the touch-sensitive surface. If the contact is still being made, the process 700 returns to decision block 760 to repeat the processing of decision blocks 760, 770, 775, 780, and 790 using electronic data more recently generated by the touch-sensitive surface. Otherwise, if at block 790 the contact with the touch-sensitive surface is no longer detected, the contact discriminating process 700 proceeds to block 795 and ends.

It should be appreciated that the amount of time defined for use in decision block 780 may be varied as needed depending on circumstances. For example, a different amount of time other than 50 ms may be used. Alternatively, the algorithm steps in the process 700 may be modified to include different threshold amounts of time at block 780 depending on the tilt angle of the touch-sensitive surface detected at block 710. Also, as mentioned earlier, the algorithm steps may evaluate the number of data records resulting from a contact with the touch-sensitive surface and compare the number of data records to a threshold, and such algorithm steps are considered equivalent to evaluating an amount of time and comparing the amount of time to a threshold, as described above.

Figure 8:
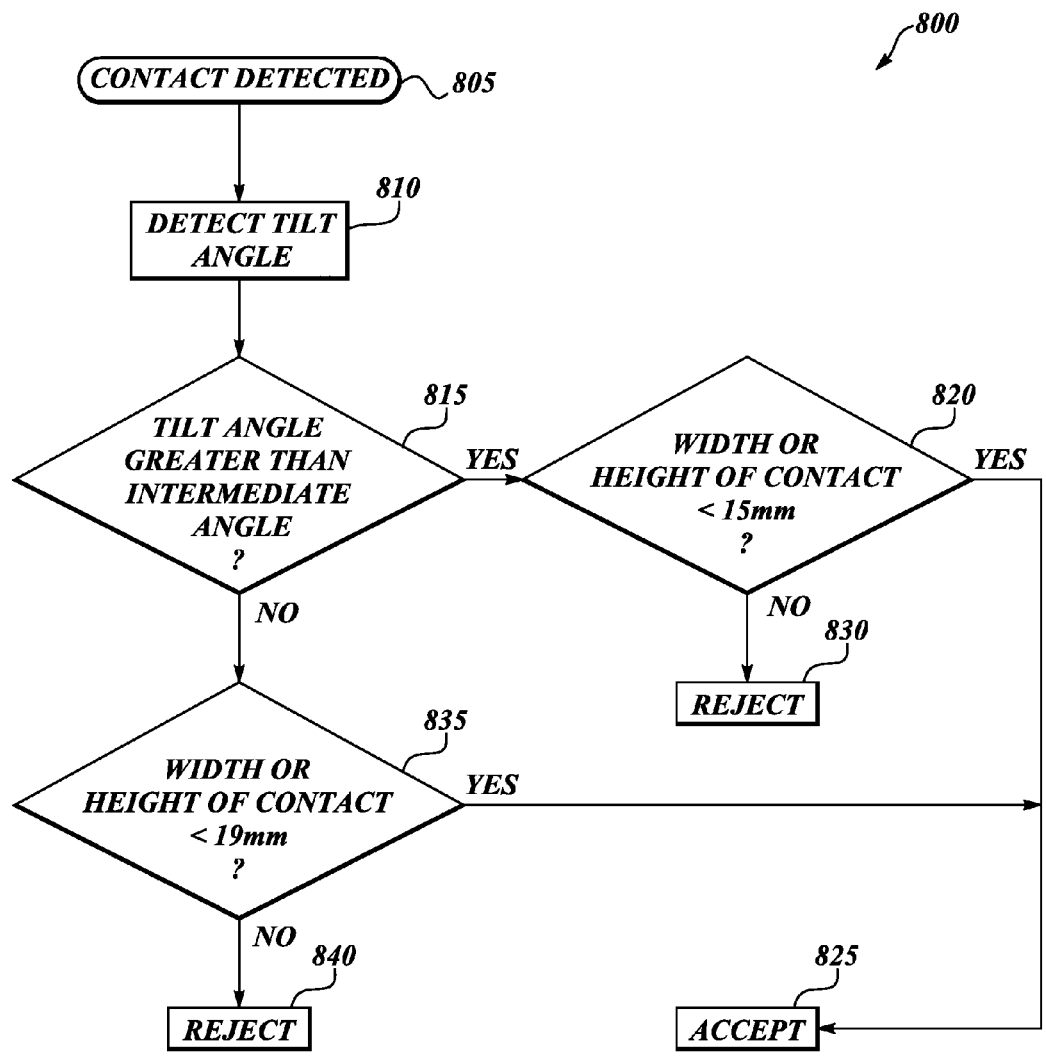
FIG. 8 is a flow diagram of a contact discriminating process according to a third exemplary embodiment described herein.

FIG. 8 provides a flow diagram of another contact discriminating process 800 conducted according to a third exemplary embodiment of the present disclosure. As mentioned earlier, a parameter or other aspect of a contact discriminating process is modifiable depending at least in part on a detected tilt angle of a touch-sensitive surface. In this particular embodiment, the parameter of the contact discriminating process 800 is a threshold size that is modified based on the detected tilt angle of the touch-sensitive surface. As will be described below, the process 800 may assess a spatial size of a contact made with the touch-sensitive surface and determine whether the spatial size of the contact reaches or exceeds the threshold size. If the determination is positive, the contact discriminating process 800 determines that the contact is intentional and the electronic data generated by the touch-sensitive surface is accepted. Otherwise, the process 800 determines that the contact is not intentional and rejects the electronic data generated by the touch-sensitive surface.

In some circumstances when the tilt angle of the touch-sensitive surface (detected with respect to an approximately horizontal reference plane) indicates that the current plane of the touch-sensitive surface is greater than an intermediate angle defined between approximately horizontal and approximately vertical, the threshold size used by the contact discriminating process 800 is modified to be less than the threshold size that would be used by the contact discriminating process 800 if the tilt angle had indicated the current plane of the touch-sensitive surface is equal to or less than the intermediate angle. In this manner, a parameter or aspect of the contact discriminating process 800 is modified to account for the fact that the contact area of an intentional touch contact tends to be smaller when the touch-sensitive surface is oriented more vertically.

Turning in particular to FIG. 8, the process 800 begins at block 805 when contact with the touch-sensitive surface is initially detected. At block 810, the tilt sensor 520 (FIG. 5) detects the tilt angle of the touch-sensitive surface. Information regarding the tilt angle is received by the contact discriminating process 800, and at decision block 815, the process 800 evaluates whether the tilt angle indicates that the touch-sensitive surface is greater than an intermediate angle, such as 45 degrees. While this particular example uses a 45-degree intermediate angle, other examples may define a different intermediate angle. If the tilt angle indicates that the touch-sensitive surface is greater than the intermediate angle, the process 800 proceeds to a decision block 820 where the process 800 evaluates the spatial size of the contact made with the touch-sensitive surface and determines whether the spatial size of the contact reaches or exceeds the threshold size. In this particular example, the threshold size used at decision block 820 is set to be 15 mm, though other threshold sizes may be used.

If, at decision block 820, the width of the contact or the height of the contact is less than 15 mm (resulting in a positive determination), the contact discriminating process 800 proceeds to block 825 where the process 800 determines that the contact is intentional and accepts the electronic data generated by the touch-sensitive surface. Otherwise, the process 800 proceeds to block 830 where the process 800 determines that the contact is not intentional and rejects the electronic data.

If, at decision block 815, the detected tilt angle is not greater than the intermediate angle (i.e., the detected tilt angle is equal to or less than the intermediate angle), the process 800 proceeds to decision block 835 where the process 800 evaluates the spatial size of the contact made with the touch sensitive surface and determines whether the spatial size of the contact is less than a threshold size such as 19 mm (other threshold sizes may be used). If the width of the contact or the height of the contact is less than 19 mm (thus making the determination positive), the contact discriminating process 800 proceeds to block 825 where the process 800 determines that the contact is intentional and accepts the electronic data generated by the touch-sensitive surface. Otherwise, the process 800 proceeds to block 840 where the process 800 determines that the contact is not intentional and rejects the electronic data. As can be seen with this example, when the touch-sensitive surface is closer to a horizontal orientation, a larger threshold size is used to identify an intentional touch contact. When the touch-sensitive surface is closer to a vertical orientation, a smaller threshold size is used to identify an intentional touch contact.

Figure 9:
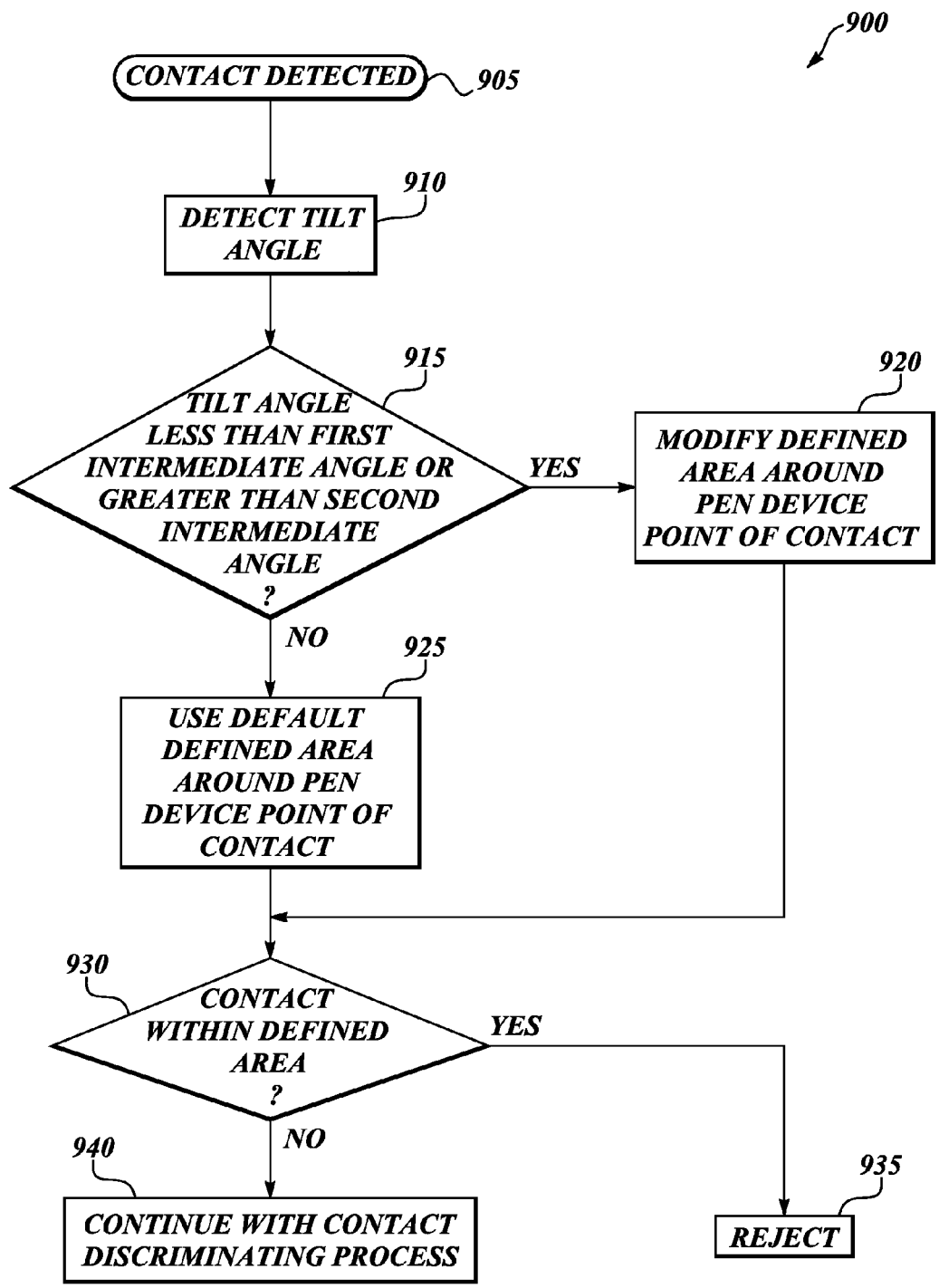
FIG. 9 is a flow diagram of a portion of a contact discriminating process according to a fourth exemplary embodiment described herein.

In some embodiments, the modification made to a parameter or other aspect of a contact discriminating process may influence only a portion of an overall contact discriminating process, such as an initial screening portion of the process. FIG. 9 provides a flow diagram of a portion of a contact discriminating process according to a fourth exemplary embodiment described herein. In this particular embodiment, the contact made with the touch sensitive device is concurrent with a pen device point of contact, and the parameter of the contact discriminating process that is modified is an area defined around the pen device point of contact. The defined area is used by the contact discriminating process to determine whether the contact made with the touch-sensitive surface is not intentional.

As with previous embodiments, the parameter (here, the defined area around the pen device point of contact) is modified based on the detected tilt angle of the touch-sensitive surface. If the contact made with the touch-sensitive surface is located within the defined area, the portion of the contact discriminating process 900 illustrated in FIG. 9 determines that the contact made with the touch-sensitive surface is not intentional. Otherwise, the processing continues at block 940 with execution of other algorithm steps, such as illustrated in FIGS. 6-8.

In the embodiment shown in FIG. 9, first and second intermediate angles are defined between approximately horizontal and approximately vertical positions. The first intermediate angle is less than the second intermediate angle. For example, the first intermediate angle may be 45 degrees and the second intermediate angle may be 75 degrees, defined relative to a horizontal reference plane. Other suitable examples may use different first and second intermediate angles.

The contact discriminating process 900 illustrated in FIG. 9 begins at block 905 when contact with the touch-sensitive surface is initially detected. Thereafter, at block 910, the tilt sensor 520 (FIG. 5) detects the tilt angle of the touch-sensitive surface. Information regarding the tilt angle is received by the contact discriminating process 900, and at decision block 915, the process 900 evaluates whether the tilt angle is less than the first intermediate angle or greater than the second intermediate angle. If the tilt angle indicates that the current plane of the touch-sensitive device is less than the first intermediate angle or greater than the second intermediate angle, the process 900 proceeds to block 920 and modifies the defined area around the pen device point of contact. In this particular example, the process 900 expands the defined area on at least one side of the pen device point of contact when the tilt angle of the touch-sensitive surface is less than 45 degrees or greater than 75 degrees. It may be noted that when touch contacts occur with the touch-sensitive surface tilted at less than 45 degrees or more than 75 degrees, it is not usual for touch contacts to be on the left of a pen device for a right-handed user. For a left-handed user, the opposite is true. At tilt angles between 45 degrees and 75 degrees, unintentional touch contacts are more likely to occur on the side of the pen contact opposite of the user's hand. Accordingly, at block 920, the defined area around the point of contact is expanded, for example to 25 mm farther from the pen device point of contact, on the opposite side of the pen.

If the tilt angle of the touch-sensitive surface is not less than the first intermediate angle and is not greater than the second intermediate angle, the process 900 proceeds from decision block 915 to block 925 where the process 900 uses a default area defined around the pen device to screen unintentional touches. At decision block 930, the process 900 evaluates whether the contact made with the touch-sensitive surface is located within the defined area of contact. If so, the contact is determined to be not intentional and the electronic data generated by the touch-sensitive surface in association with the contact is rejected. Otherwise, if the contact made with the touch-sensitive surface is not located within the defined area of contact, the processing continues at block 940 with additional algorithm steps such as those shown in FIGS. 6-8 to determine whether the contact with the touch-sensitive surface is intentional or not intentional.

Figure 10:
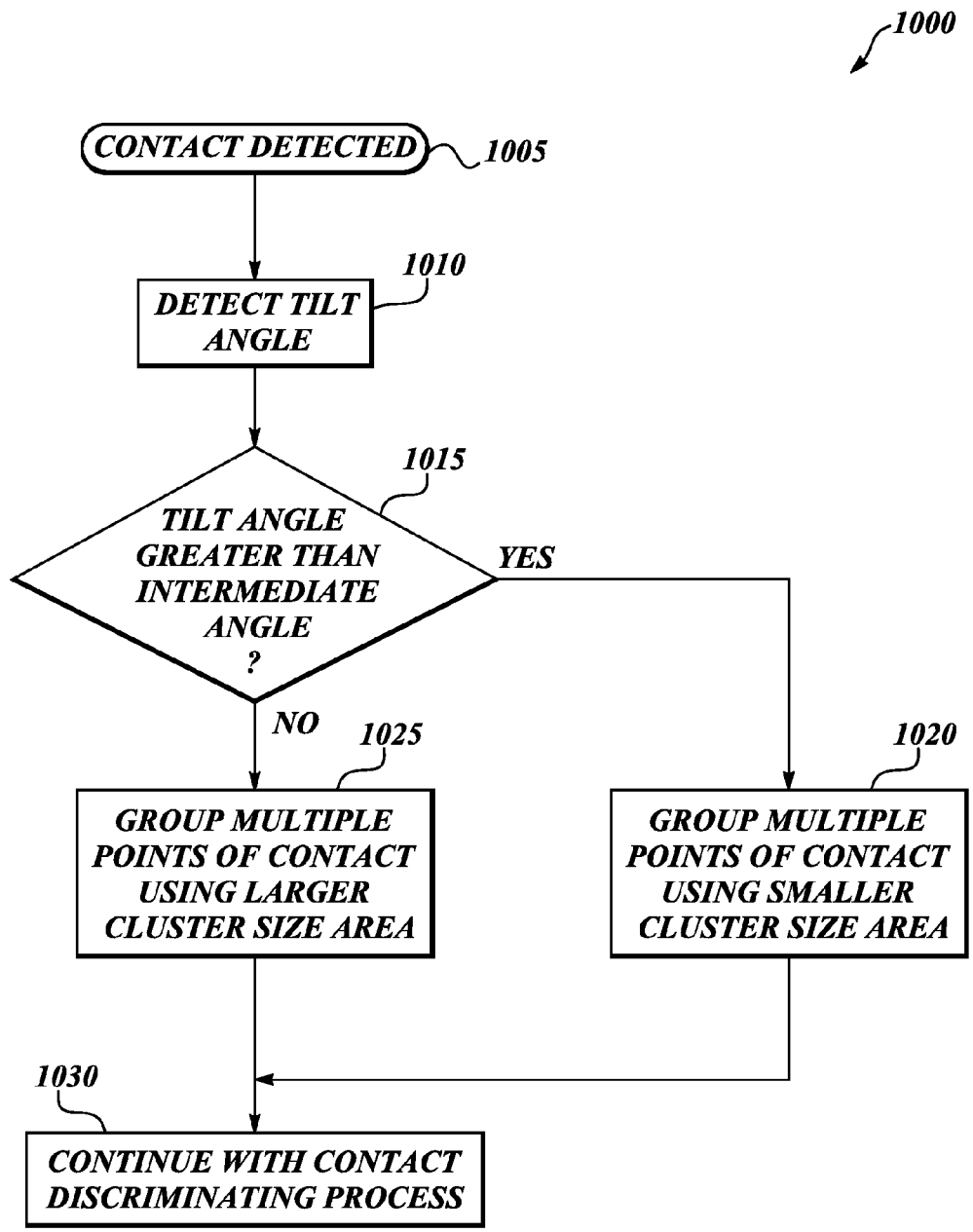
FIG. 10 is a flow diagram of a portion of a contact discriminating process according to a fifth exemplary embodiment described herein.

FIG. 10 provides a flow diagram of a portion of a contact discriminating process according to a fifth exemplary embodiment. In this particular embodiment, the contact made with the touch sensitive surface includes multiple points of contact, and the parameter of the contact discriminating process that is modifiable based on the tilt angle of the touch-sensitive surface is a size of a defined area for grouping multiple points of contact as a cluster. As with FIG. 9, the defined area is used to determine whether the contact made with the touch-sensitive surface is not intentional.

The contact discriminating process 1000 illustrated in FIG. 10 begins at block 1005 when contact with the touch-sensitive surface is initially detected. Thereafter, at block 1010, the tilt sensor 520 (FIG. 5) detects the tilt angle of the touch-sensitive surface. Information regarding the tilt angle is received by the contact discriminating process 1000, and at decision block 1015, the process 1000 evaluates whether the tilt angle is greater than an intermediate angle. If the tilt angle indicates that the current plane of the touch-sensitive surface is greater than the intermediate angle, the process 1000 proceeds to block 1020 and modifies the defined area for grouping multiple points of contact as a cluster. At block 1020, multiple points of contact on the touch-sensitive surface are grouped using a smaller cluster size area.

If, at decision block 1015, the tilt angle indicates that the touch-sensitive surface is not tilted at an angle greater than the intermediate angle, the process 1000 proceeds to block 1025 and modifies the defined area for grouping multiple points of contact to be larger. Accordingly, at block 1025, multiple points of contact on the touch-sensitive surface are grouped as a cluster using a larger cluster size area. Thereafter, the contact discriminating process continues at block 1030 with additional algorithm steps such as those shown in FIGS. 6-8 to determine whether the multiple contacts in the cluster of contacts are intentional or not intentional.

In this manner, an intermediate angle may be defined between an approximately horizontal position and an approximately vertical position, and in response to the tilt angle indicating that the current plane of the touch-sensitive surface is less than or equal to the intermediate angle, the defined area for clustering multiple contacts is modified to be a larger size area. Conversely, in response to the tilt angle indicating the tilt angle is greater than the intermediate angle, the defined area is modified to be a smaller size area.

While systems and methods have been described above and shown in the accompanying figures, persons of ordinary skill in the art will also recognize that the present disclosure also encompasses non-transitory computer readable storage media that can store computer-executable instructions that, in response to execution by a computing device, cause the computing device to perform any of the methods described herein, including the methods described with respect to FIGS. 6-10. In particular, with regard to the embodiment shown in FIG. 5, the memory 540 constitutes a suitable non-transitory computer readable storage medium.

It is also recognized that the various embodiments described above can be combined to provide further embodiments. These and other changes can be made to the embodiments in light of the above-detailed description. In general, in the following claims, the terms used should not be construed to limit the claims to the specific embodiments disclosed in the specification. Rather the claims should be construed to include all possible embodiments along with the full scope of equivalents to which such claims are entitled.

What is claimed is:

1. A method comprising:
   receiving, by a computing device, electronic data generated by a touch-sensitive surface in response to a contact made with the touch-sensitive surface;
   detecting, by a tilt sensor, a tilt angle of the touch-sensitive surface, wherein the tilt angle is indicative of an angular displacement between a reference plane defined by the touch-sensitive surface in a reference position and a current plane defined by the touch-sensitive surface in a current position;
   modifying a parameter of an automated contact discriminating process based at least in part on the detected tilt angle of the touch-sensitive surface;
   determining, by the contact discriminating process, whether the contact made with the touch-sensitive surface is intentional or not intentional to convey input via the touch-sensitive surface;
   in response to determining that the contact made with the touch-sensitive surface is intentional, accepting the electronic data as output from the touch-sensitive surface for further processing; and
   in response to determining that the contact made with the touch-sensitive surface is not intentional, rejecting the electronic data as output from the touch-sensitive surface.

2. The method of claim 1, further comprising rejecting the electronic data generated by the touch-sensitive surface until the contact discriminating process determines that the contact made with the touch-sensitive surface is intentional.

3. The method of claim 1, wherein the electronic data generated by the touch-sensitive surface is received as a sequence of data records, and wherein the parameter of the contact discriminating process is a threshold number of data records, the method further comprising:
   modifying the threshold number of data records based on the detected tilt angle of the touch-sensitive surface;
   monitoring a number of data records received while the contact made with the touch-sensitive surface is continuous; and
   determining, by the contact discriminating process, that the contact made with the touch-sensitive surface is intentional in response to the monitored number of data records reaching or exceeding the threshold number of data records.

4. The method of claim 3, wherein when the reference plane is approximately horizontal and the tilt angle indicates the current plane is between approximately horizontal and approximately vertical, the threshold number of data records used by the contact discriminating process is modified to be higher than the threshold number of data records that would be used by the contact discriminating process if the tilt angle had indicated the current plane is approximately horizontal or approximately vertical.

5. The method of claim 3, wherein when the reference plane is approximately horizontal and the tilt angle indicates the current plane is approximately vertical, the threshold number of data records used by the contact discriminating process is modified to be less than the threshold number of data records that would be used by the contact discriminating process if the tilt angle had indicated the current plane is approximately horizontal.

6. The method of claim 1, wherein the parameter of the contact discriminating process is a threshold amount of time, the method further comprising:
modifying the threshold amount of time based on the detected tilt angle of the touch-sensitive surface;
monitoring an amount of time the contact is continuously made with the touch-sensitive surface; and
determining, by the contact discriminating process, that the contact made with the touch-sensitive surface is intentional in response to the monitored amount of time reaching or exceeding the threshold amount of time.

7. The method of claim 6, wherein when the reference plane is approximately horizontal and the tilt angle indicates the current plane is between approximately horizontal and approximately vertical, the threshold amount of time used by the contact discriminating process is modified to be higher than the threshold amount of time that would be used by the contact discriminating process if the tilt angle had indicated the current plane is approximately horizontal or approximately vertical.

8. The method of claim 6, wherein when the reference plane is approximately horizontal and the tilt angle indicates the current plane is approximately vertical, the threshold amount of time used by the contact discriminating process is modified to be less than the threshold amount of time that would be used by the contact discriminating process if the tilt angle had indicated the current plane is approximately horizontal.

9. The method of claim 1, wherein the parameter of the contact discriminating process is a threshold size, the method further comprising:
modifying the threshold size based on the detected tilt angle of the touch-sensitive surface;
assessing a spatial size of the contact with the touch-sensitive surface; and
determining, by the contact discriminating process, whether the spatial size of the contact made with the touch-sensitive surface reaches or exceeds the threshold size, and if the determination is positive, the contact discriminating process determines that the contact is not intentional.

10. The method of claim 9, when the reference plane is approximately horizontal and the tilt angle indicates the current plane is greater than an intermediate angle between approximately horizontal and approximately vertical, the threshold size used by the contact discriminating process is modified to be less than the threshold size that would be used by the contact discriminating process if the tilt angle had indicated the current plane is equal to or less than the intermediate angle.

11. The method of claim 1, wherein the contact made with the touch sensitive device is concurrent with a pen device point of contact on the touch sensitive surface, and wherein the parameter of the contact discriminating process is an area defined around the pen device point of contact for determining whether the contact made with the touch-sensitive surface is not intentional, the method further comprising:
modifying the defined area around the pen device point of contact based on the detected tilt angle of the touch-sensitive surface; and
if the contact made with the touch-sensitive surface is within the defined area, determining that the contact made with the touch-sensitive surface is not intentional.

12. The method of claim 11, wherein a first intermediate angle and a second intermediate angle are defined between approximately horizontal and approximately vertical, the first intermediate angle being less than the second intermediate angle, and in response to the tilt angle indicating the current plane is less than the first intermediate angle or greater than the second intermediate angle, the method comprises modifying the defined area around the pen device point of contact to expand the defined area on at least one side of the pen device point of contact.

13. The method of claim 1, wherein the contact made with the touch sensitive surface includes multiple points of contact, and wherein the parameter of the contact discriminating process is a size of a defined area for grouping multiple points of contact as a cluster, the method further comprising:
modifying the size of the defined area based on the detected tilt angle of the touch-sensitive surface;
grouping multiple points of contact as a cluster using the defined area; and
determining, by the contact discriminating process, whether the cluster of points of contact made with the touch-sensitive surface is intentional or not intentional.

14. The method of claim 13, wherein an intermediate angle is defined between approximately horizontal and approximately vertical, the method further comprising:
in response to the tilt angle indicating the current plane is less than or equal to the intermediate angle, modifying the size of the defined area to be a larger size area; and
in response to the tilt angle indicating the current plane is greater than the intermediate angle, modifying the size of the defined area to be a smaller size area.

15. A system comprising:
a computing device including processing logic;
a touch-sensitive surface in communication with the computing device; and
a tilt sensor adapted to detect a tilt angle of the touch-sensitive surface, wherein the tilt angle is indicative of an angular displacement between a reference plane defined by the touch-sensitive surface in a reference position and a current plane defined by the touch-sensitive surface in a current position,
wherein the processing logic causes the computing device to:
receive electronic data generated by the touch-sensitive surface in response to a contact made with the touch-sensitive surface;
detect, by the tilt sensor, a tilt angle of the touch-sensitive surface;
modify at least one aspect of an automated contact discriminating process based at least in part on the detected tilt angle of the touch-sensitive surface;
determine, by the contact discriminating process, whether the contact made with the touch-sensitive surface is intentional or not intentional to convey input via the touch-sensitive surface;
in response to determining that the contact made with the touch-sensitive surface is intentional, accept the electronic data as output from the touch-sensitive surface for further processing; and
in response to determining that the contact made with the touch-sensitive surface is not intentional, reject the electronic data as output from the touch-sensitive surface.

16. The system of claim 15, wherein the computing device receives the electronic data generated by the touch-sensitive surface as a sequence of data records, and wherein the at least one aspect of the contact discriminating process is a threshold number of data records, the processing logic further causing the computing device to:
- modify the threshold number of data records based on the detected tilt angle of the touch-sensitive surface;
- monitor a number of data records received while the contact made with the touch-sensitive surface is continuous; and
- determine, by the contact discriminating process, that the contact made with the touch-sensitive surface is intentional in response to the monitored number of data records reaching or exceeding the threshold number of data records, wherein:
- when the reference plane is approximately horizontal and the tilt angle indicates the current plane is between approximately horizontal and approximately vertical, the threshold number of data records used by the contact discriminating process is modified to be higher than the threshold number of data records that would be used by the contact discriminating process if the tilt angle had indicated the current plane is approximately horizontal or approximately vertical, and
- when the reference plane is approximately horizontal and the tilt angle indicates the current plane is approximately vertical, the threshold number of data records used by the contact discriminating process is modified to be less than the threshold number of data records that would be used by the contact discriminating process if the tilt angle had indicated the current plane is approximately horizontal.

17. The system of claim 15, wherein the at least one aspect of the contact discriminating process is a threshold amount of time, and wherein the processing logic further causes the computing device to:
- modify the threshold amount of time based on the detected tilt angle of the touch-sensitive surface;
- monitor an amount of time the contact is continuously made with the touch-sensitive surface; and
- determine, by the contact discriminating process, that the contact made with the touch-sensitive surface is intentional in response to the monitored amount of time reaching or exceeding the threshold amount of time, wherein:
- when the reference plane is approximately horizontal and the tilt angle indicates the current plane is between approximately horizontal and approximately vertical, the threshold amount of time used by the contact discriminating process is modified to be higher than the threshold amount of time that would be used by the contact discriminating process if the tilt angle had indicated the current plane is approximately horizontal or approximately vertical, and
- when the reference plane is approximately horizontal and the tilt angle indicates the current plane is approximately vertical, the threshold amount of time used by the contact discriminating process is modified to be less than the threshold amount of time that would be used by the contact discriminating process if the tilt angle had indicated the current plane is approximately horizontal.

18. The system of claim 15, wherein, based on the detected tilt angle, the contact discriminating process is modified to execute one or more different algorithm steps to determine whether the contact made with the touch-sensitive surface is intentional or not intentional.

19. The system of claim 18, wherein, when the reference plane is approximately horizontal and the tilt angle indicates the current plane is approximately vertical, the processing logic causes the computing device to execute algorithm steps that evaluate the electronic data to determine whether the contact made with the touch-sensitive surface is near a point of contact of a pen device on the touch-sensitive surface,
- wherein if the contact made with the touch-sensitive surface is not near a point of contact of a pen device, the contact discriminating process determines that the contact made with the touch-sensitive surface is intentional, and
- wherein if the contact made with the touch-sensitive surface is near a point of contact of a pen device, the contact discriminating process determines that the contact is not intentional.

20. The system of claim 18, wherein, when the reference plane is approximately horizontal and the tilt angle indicates the current plane is also approximately horizontal, the processing logic causes the computing device to execute algorithm steps that:
(1) evaluate the electronic data to determine whether a spatial size of the contact made with the touch-sensitive surface reaches or exceeds a threshold size, and if the determination is positive, the contact discriminating process determines that the contact is not intentional, and
(2) evaluate the electronic data to determine whether the contact made with the touch-sensitive surface is near another contact on the touch-sensitive surface having a spatial size exceeding a threshold size, and if the determination is positive, the contact discriminating process determines that the contact is not intentional,
otherwise if the determination in the algorithm steps (1) and (2) is negative, the contact discriminating process determines that the contact made with the touch-sensitive surface is intentional.

21. The system of claim 18, wherein, when the reference plane is approximately horizontal and the tilt angle indicates the current plane is between approximately horizontal and approximately vertical, the processing logic causes the computing device to execute algorithm steps that:
(1) evaluate the electronic data to determine whether the contact made with the touch-sensitive surface is near a point of contact of a pen device on the touch-sensitive surface, and if the determination is positive, the contact discriminating process determines that the contact is not intentional,
(2) evaluate the electronic data to determine whether a spatial size of the contact made with the touch-sensitive surface reaches or exceeds a threshold size, and if the determination is positive, the contact discriminating process determines that the contact is not intentional, and
(3) evaluate the electronic data to determine whether the contact made with the touch-sensitive surface is near another contact on the touch-sensitive surface having a spatial size reaching or exceeding a threshold size, and if the determination is positive, the contact discriminating process determines that the contact is not intentional, and
if the determination in the algorithm steps (1), (2), and (3) is negative, the processing logic causes the computing device to execute a further algorithm step that:
(4) evaluates an amount of time the contact is continuously made with the touch-sensitive surface, and if the amount of time has reached or exceeded a threshold amount of time, the contact discriminating process determines that the contact is intentional, otherwise the processing logic causes the computing device to repeat execution of the algorithm steps (1) to (4) using electronic data more-recently generated by the touch-sensitive surface in response to the contact made with the touch-sensitive surface.

22. The system of claim 15, wherein the at least one aspect of the contact discriminating process is a threshold size, and wherein the processing logic further causes the computing device to:

modify the threshold size based on the detected tilt angle of the touch-sensitive surface;

assess a spatial size of the contact with the touch-sensitive surface; and determine, by the contact discriminating process, whether the spatial size of the contact made with the touch-sensitive surface reaches or exceeds the threshold size, and if the determination is positive, the contact discriminating process determines that the contact is not intentional, wherein when the reference plane is approximately horizontal and the tilt angle indicates the current plane is greater than an intermediate angle between approximately horizontal and approximately vertical, the threshold size used by the contact discriminating process is modified to be less than the threshold size that would be used by the contact discriminating process if the tilt angle had indicated the current plane is equal to or less than the intermediate angle.

23. The system of claim 15, wherein the contact made with the touch sensitive device is concurrent with a pen device point of contact on the touch sensitive surface, and wherein the at least one aspect of the contact discriminating process is an area defined around the pen device point of contact for determining whether the contact made with the touch-sensitive surface is not intentional, the processing logic causing the computing device to:

modify the defined area around the pen device point of contact based on the detected tilt angle of the touch-sensitive surface, wherein a first intermediate angle and a second intermediate angle are defined between approximately horizontal and approximately vertical, the first intermediate angle being less than the second intermediate angle, and in response to the detected tilt angle indicating the current plane is less than the first intermediate angle or greater than the second intermediate angle, the defined area around the pen device point of contact is expanded on at least one side of the pen device point of contact; and if the contact made with the touch-sensitive surface is within the defined area, determine that the contact made with the touch-sensitive surface is not intentional.

24. The system of claim 15, wherein the contact made with the touch sensitive surface includes multiple points of contact, and wherein the at least one aspect of the contact discriminating process is a size of a defined area for grouping multiple points of contact as a cluster, the processing logic causing the computing device to:

modify the size of the defined area based on the detected tilt angle of the touch-sensitive surface, wherein an intermediate angle is defined between approximately horizontal and approximately vertical, and in response to the tilt angle indicating the current plane is less than or equal to the intermediate angle, the size of the defined area is modified to be a larger size area, and in response to the tilt angle indicating the current plane is greater than the intermediate angle, the size of the defined area is modified to be a smaller size area;

group multiple points of contact as a cluster using the defined area; and determine, by the contact discriminating process, whether the cluster of points of contact made with the touch-sensitive surface is intentional or not intentional.

25. A non-transitory computer readable storage medium comprising computer-executable instructions stored thereon, wherein the instructions, in response to execution by a computing device, cause the computing device to:

receive electronic data generated by a touch-sensitive surface in response to a contact made with the touch-sensitive surface;

detect, by a tilt sensor, a tilt angle of the touch-sensitive surface, wherein the tilt angle is indicative of an angular displacement between a reference plane defined by the touch-sensitive surface in a reference position and a current plane defined by the touch-sensitive surface in a current position;

modify at least one aspect of an automated contact discriminating process based at least in part on the detected tilt angle of the touch-sensitive surface;

determine, by the contact discriminating process, whether the contact made with the touch-sensitive surface is intentional or not intentional to convey input via the touch-sensitive surface;

in response to determining that the contact made with the touch-sensitive surface is intentional, accept the electronic data as output from the touch-sensitive surface for further processing; and in response to determining that the contact made with the touch-sensitive surface is not intentional, reject the electronic data as output from the touch-sensitive surface.

* * * * *